United States Patent
Kim et al.

(10) Patent No.: US 12,474,784 B2
(45) Date of Patent: Nov. 18, 2025

(54) ELECTRONIC APPARATUS AND CONTROLLING METHOD THEREOF

(71) Applicant: SAMSUNG ELECTRONICS CO., LTD., Suwon-si (KR)

(72) Inventors: Yeonwoo Kim, Suwon-si (KR); Sehyun Kim, Suwon-si (KR); Donguk Kim, Suwon-si (KR); Jongin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/590,517

(22) Filed: Feb. 28, 2024

(65) Prior Publication Data

US 2024/0377895 A1    Nov. 14, 2024

Related U.S. Application Data

(63) Continuation of application No. PCT/KR2024/001167, filed on Jan. 25, 2024.

(30) Foreign Application Priority Data

May 11, 2023    (KR) .......................... 10-2023-0061302

(51) Int. Cl.
*G06F 3/02*     (2006.01)
*G06F 3/041*    (2006.01)
(Continued)

(52) U.S. Cl.
CPC ........ *G06F 3/0205* (2013.01); *G06F 3/04162* (2019.05); *G06F 3/04817* (2013.01); *G06F 3/04842* (2013.01); *G06F 3/04847* (2013.01)

(58) Field of Classification Search
CPC ....................................................... G06F 3/011
See application file for complete search history.

(56) References Cited

U.S. PATENT DOCUMENTS 6,585,593 B1 *    7/2003    Okano .................. A63F 13/214
                                                          463/31
8,771,071 B2 *    7/2014    Zalewski ................ A63F 13/45
                                                          345/158
(Continued)

FOREIGN PATENT DOCUMENTS

JP    2018-143785 A    9/2018
JP    2022-181300 A    12/2022
(Continued)

OTHER PUBLICATIONS

International Search Report dated May 7, 2024, issued by the International Searching Authority in International Application No. PCT/KR2024/001167.
(Continued)

*Primary Examiner* — Nan-Ying Yang
(74) *Attorney, Agent, or Firm* — Sughrue Mion, PLLC

(57) ABSTRACT

An electronic apparatus may include: a communication interface configured to communicate with an external apparatus; a display; at least one memory storing instructions; and at least one processor operatively connected to the at least one memory. The at least one processor may be configured to execute the instructions to: based on content being output on the display, transmit first user interface (UI) information corresponding to a UI related to control of the content to the external apparatus through the communication interface, control the display to output a first control UI together with the content based on the first UI information, and based on a user input being received through a second control UI output on the external apparatus based on the first UI information, control the display to output a guide UI in an input location corresponding to the user input together with the content and the first control UI.

18 Claims, 26 Drawing Sheets

(51) Int. Cl.
  *G06F 3/04817* (2022.01)
  *G06F 3/04842* (2022.01)
  *G06F 3/04847* (2022.01)

(56) References Cited

U.S. PATENT DOCUMENTS

| | | |
|---|---|---|
| 8,953,099 B2 | 2/2015 | Kwak |
| 10,019,782 B2 | 7/2018 | Yeo et al. |
| 11,025,855 B2 | 6/2021 | Jeong et al. |
| 11,275,405 B2 | 3/2022 | Hotelling |
| 2013/0088629 A1 | 4/2013 | Ryu |
| 2014/0213360 A1* | 7/2014 | Takagi ............... A63F 13/323 463/31 |
| 2014/0243086 A1 | 8/2014 | Yang et al. |
| 2016/0216852 A1* | 7/2016 | Lee .................. G06F 3/04842 |
| 2017/0277498 A1* | 9/2017 | Wood, Jr. ............ G06F 3/0481 |

FOREIGN PATENT DOCUMENTS

| | | |
|---|---|---|
| KR | 10-2014-0077015 A | 6/2014 |
| KR | 10-2014-0116240 A | 10/2014 |
| KR | 10-1779858 B1 | 9/2017 |
| KR | 10-1888681 B1 | 8/2018 |
| KR | 10-2019-0005038 A | 1/2019 |
| KR | 10-2019-0065228 A | 6/2019 |
| KR | 10-2053315 B1 | 12/2019 |
| KR | 10-2021-0041815 A | 4/2021 |
| KR | 10-2021-0073911 A | 6/2021 |
| KR | 10-2369256 B1 | 3/2022 |
| KR | 10-2431712 B2 | 8/2022 |

OTHER PUBLICATIONS

Written Opinion dated May 7, 2024, issued by the International Searching Authority in International Application No. PCT/KR2024/001167.

* cited by examiner

ELECTRONIC APPARATUS AND CONTROLLING METHOD THEREOF

CROSS-REFERENCE TO RELATED APPLICATION

This application is a bypass continuation of International Application No. PCT/KR2024/001167, filed on Jan. 25, 2024, which is based on and claims priority to Korean Patent Application No. 10-2023-0061302, filed on May 11, 2023, in the Korean Intellectual Property Office, the disclosures of which are incorporated by reference herein in their entireties.

BACKGROUND

1. Field

The disclosure relates to an electronic apparatus and a controlling method thereof, and more particularly, to an electronic apparatus that transmits user interface (UI) information to an external apparatus such that a control UI is displayed on the external apparatus, and a controlling method thereof.

2. Description of Related Art

An electronic apparatus including a display such as a television (TV) can display various content. Depending on the content, a dedicated controller (e.g., a game pad) may be used. A user may manipulate content displayed on a TV by using a dedicated controller.

In case a dedicated controller for manipulating content cannot be connected to a TV (e.g., a dedicated controller is not possessed by the user or is not charged), there is a problem that a user cannot manipulate the content.

In case a dedicated controller cannot be connected to a TV, an electronic apparatus may display a virtual control UI on an external apparatus (e.g., a smartphone), etc. A user can manipulate content through a control UI displayed on an external apparatus instead of a dedicated controller.

In the case of manipulating a content through a control UI of an external apparatus but not a dedicated controller, properly engaging the user's touch can be difficult.

SUMMARY

Provided are an electronic apparatus that displays a guide UI corresponding to a user touch, and a controlling method thereof.

According to an aspect of the disclosure, an electronic apparatus may include: a communication interface configured to communicate with an external apparatus; a display; at least one memory storing instructions; and at least one processor operatively connected to the at least one memory. The at least one processor may be configured to execute the instructions to: based on content being output on the display, transmit first user interface (UI) information corresponding to a UI related to control of the content to the external apparatus through the communication interface, control the display to output a first control UI together with the content based on the first UI information, and based on a user input being received through a second control UI output on the external apparatus based on the first UI information, control the display to output a guide UI in an input location corresponding to the user input together with the content and the first control UI, based on a first UI output location of the first control UI, a second UI output location of the second control UI, and input information corresponding to the user input.

The at least one processor may be further configured to execute the instructions to: acquire second UI information based on the first UI information and size information of the external apparatus through the communication interface, and transmit the second UI information to the external apparatus through the communication interface.

The at least one processor may be further configured to execute the instructions to: acquire third UI information based on the first UI information and size information of the electronic apparatus, and control the display to output the first control UI together with the content based on the third UI information.

The at least one processor may be further configured to execute the instructions to: based on the user input being received through the second control UI output on the external apparatus based on the second UI information, acquire the first UI output location based on the third UI information, acquire the second UI output location based on the second UI information, and acquire the input location based on the input information.

The at least one processor may be further configured to execute the instructions to: control the display to output at least one of the first control UI or the guide UI together with the content based on predetermined transparency.

The at least one processor may be further configured to execute the instructions to: based on a user input for changing the first UI output location being received, control the display to output the first control UI in the first UI output location corresponding to the user input.

The at least one processor may be further configured to execute the instructions to: acquire an apparatus location of the external apparatus, and control the display to output the first control UI in the first UI output location to correspond to the apparatus location.

The at least one processor may be further configured to execute the instructions to: control the display to output the first control UI including at least one button among a plurality of buttons included in the first UI information.

The at least one processor may be further configured to execute the instructions to: based on the user input being received through the second control UI output on the external apparatus, control the display to output the guide UI by changing color based on whether the input location is in a predetermined area.

The at least one processor may be further configured to execute the instructions to: based on input information corresponding to a plurality of user inputs being received within a predetermined time through the second control UI output on the external apparatus, transmit a signal for controlling the second UI output location according to an input pattern acquired based on the input information to the external apparatus through the communication interface.

According to an aspect of the disclosure, a method of controlling an electronic apparatus communicating with an external apparatus, the method may include: based on content being output, transmitting first user interface (UI) information corresponding to a UI related to control of the content to the external apparatus; outputting a first control UI together with the content based on the first UI information; and based on a user input being received through a second control UI output on the external apparatus based on the first UI information, outputting a guide UI in an input location corresponding to the user input together with the content and the first control UI, based on a first UI output location of the first control UI, a second UI output location of the second control UI, and input information corresponding to the user input.

The transmitting the first UI information to the external apparatus may include: acquiring second UI information based on the first UI information and size information of the external apparatus; and transmitting the second UI information to the external apparatus.

The outputting the first control UI may include: acquiring third UI information based on the first UI information and size information of the electronic apparatus; and outputting the first control UI together with the content based on the third UI information.

The outputting the guide UI may include: based on the user input being received through the second control UI output on the external apparatus based on the second UI information, acquiring the first UI output location of the first control UI based on the third UI information, acquiring the second UI output location based on the second UI information, and acquiring the input location based on the input information.

The method further may include: outputting at least one of the first control UI or the guide UI together with the content based on predetermined transparency.

The method further may include: based on a user input for changing the first UI output location being received, outputting the first control UI in the first UI output location corresponding to the user input.

The method further may include: acquiring an apparatus location of the external apparatus; and outputting the first control UI in the first UI output location to correspond to the apparatus location.

The method further may include: outputting the first control UI including at least one button among a plurality of buttons included in the first UI information.

The method further may include: based on the user input being received through the second control UI output on the external apparatus, outputting the guide UI by changing color based on whether the input location is in a predetermined area.

The method further may include: based on input information corresponding to a plurality of user inputs being received within a predetermined time through the second control UI output on the external apparatus, transmitting a signal for controlling the second UI output location according to an input pattern acquired based on the input information to the external apparatus through the communication interface.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
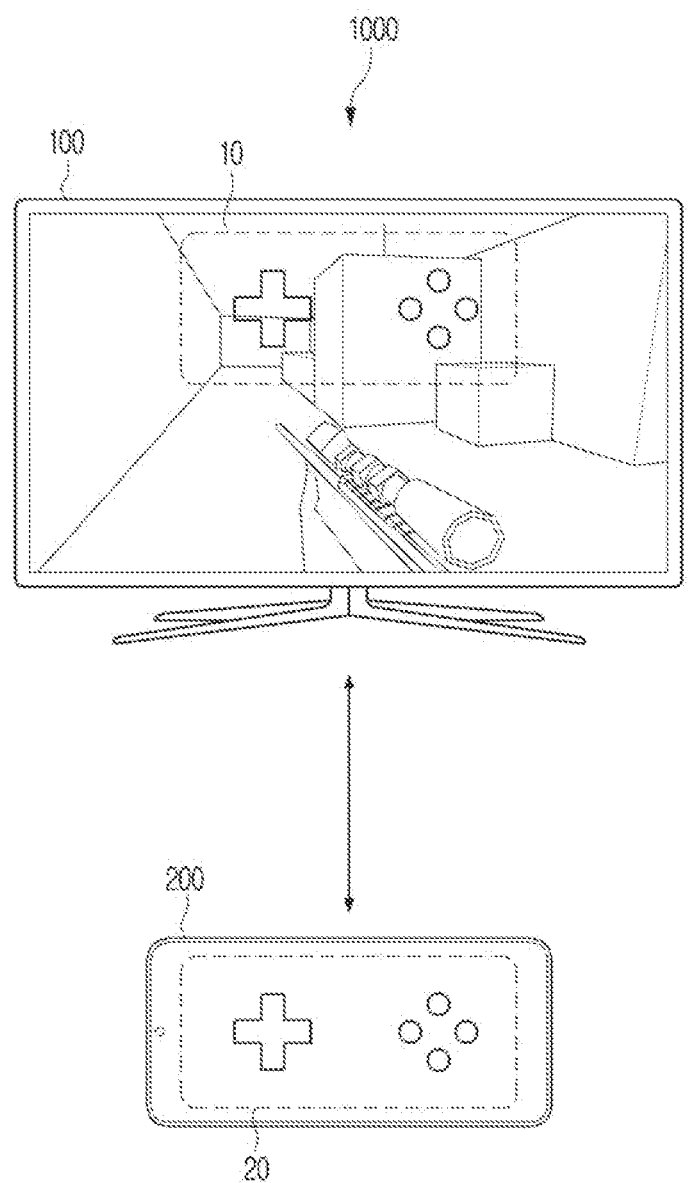
FIG. 1 is a diagram for illustrating a system including an electronic apparatus and an external apparatus.

Hereinafter, example embodiments of the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expressions "at least one of A and B" and "at least one of A or B" should be interpreted to mean any one of "A" or "B" or "A and B." As another example, "performing at least one of steps 1 and 2" or "performing at least one of steps 1 or 2" means the following three juxtaposition situations: (1) performing step 1; (2) performing step 2; (3) performing steps 1 and 2.

Further, the expressions "first," "second," and the like used in this specification may be used to describe various elements regardless of any order and/or degree of importance. Also, such expressions are used only to distinguish one element from another element, and are not intended to limit the elements.

In addition, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Further, singular expressions include plural expressions, unless defined obviously differently in the context. Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Elements described as "modules" or "part" may be physically implemented by analog and/or digital circuits including one or more of a logic gate, an integrated circuit, a microprocessor, a microcontroller, a memory circuit, a passive electronic component, an active electronic component, and the like.

Also, in this specification, the term "user" may refer to a person who uses an electronic apparatus or an apparatus using an electronic apparatus (e.g.: an artificial intelligence electronic apparatus).

Hereinafter, one or more embodiments of the disclosure will be described in more detail with reference to the accompanying drawings.

FIG. 1 is a diagram for illustrating a system 1000 including an electronic apparatus 100 and an external apparatus 200.

Referring to FIG. 1, the system 1000 may include at least one of the electronic apparatus 100 or the external apparatus 200.

The electronic apparatus 100 may include a display. Also, the electronic apparatus 100 may display content. The content may include image frames. Also, content may mean a still image or a moving image, etc. For example, content may mean a game, a broadcasting content, an education content, etc. However, content is not limited to any specific embodiment.

The external apparatus 200 may include a display. The external apparatus 200 may display a second control UI 20 related to content displayed on the electronic apparatus 100 on the display. The second control UI 20 may include at least one UI for manipulating content displayed on the electronic apparatus 100. The second control UI 20 may vary according to content displayed on the electronic apparatus 100.

The second control UI 20 displayed on the external apparatus 200 may be displayed as a first control UI 10 on the electronic apparatus 100. In the description below, it will be described that the first control UI 10 is displayed on the electronic apparatus 100. However, depending on implementation examples, the first control UI 10 may not be displayed on the electronic apparatus 100.

The control UI may be described as a UI related to control, a UI for control, a manipulation UI, a UI related to manipulation, a UI for manipulation, etc.

Figure 2:
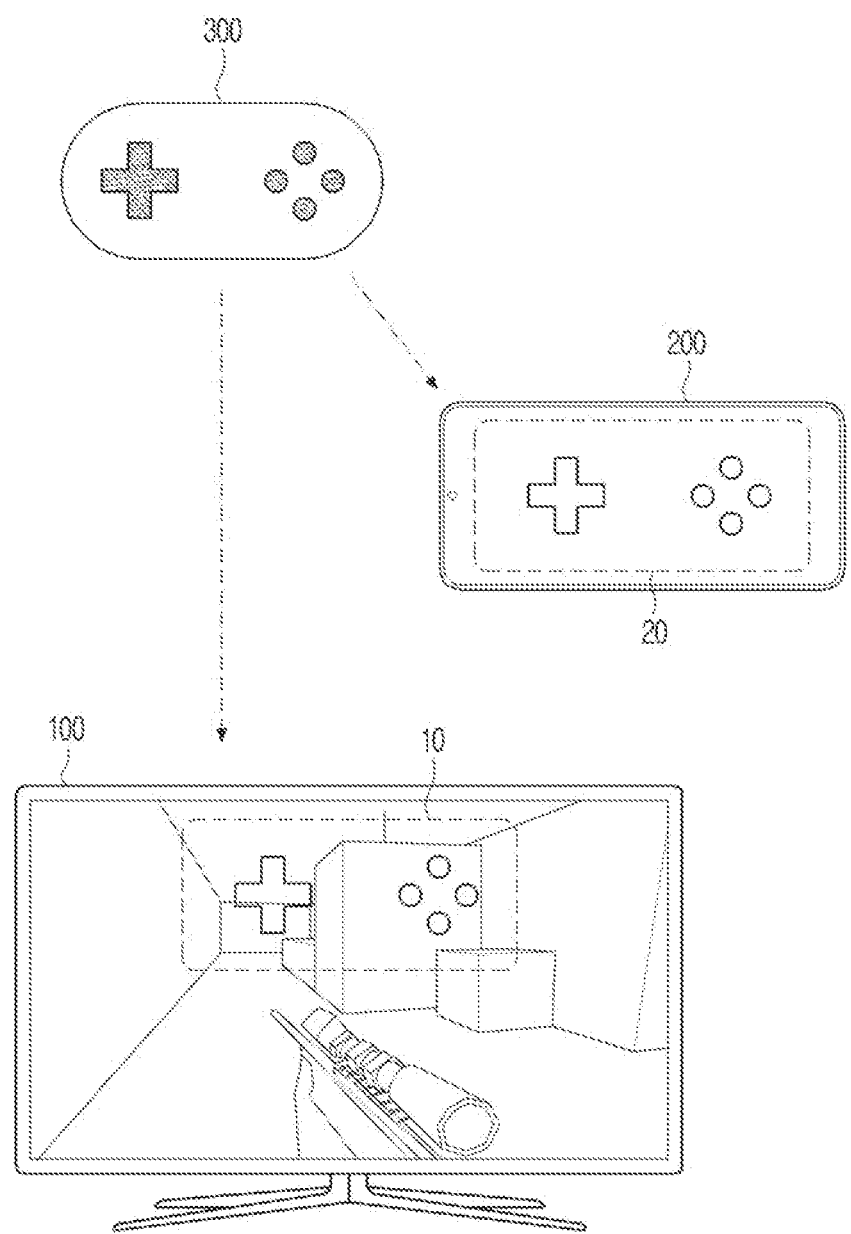
FIG. 2 is a diagram for illustrating a control UI displayed on an electronic apparatus and an external apparatus.

FIG. 2 is a diagram for illustrating a control UI displayed on the electronic apparatus 100 and the external apparatus 200.

Referring to FIG. 2, it is assumed that an A content is displayed on the electronic apparatus 100. For manipulating the A content, a dedicated controller may exist. It is assumed that the dedicated controller is a controller 300. The controller 300 may mean at least one of a physical hardware apparatus or a virtual UI (virtual control UI).

The controller 300 may include at least one button (or element). UI information corresponding to the controller 300 may include information related to a button of the controller 300. The UI information may include at least one of the shape, the location, the area, the size, the color, or the transparency of the button. The area may indicate the area information that will be described with reference to FIG. 15. The area information may be included only in some cases, and may not be included in some UI information.

The electronic apparatus 100 or the external apparatus 200 may display a control UI based on the UI information corresponding to the controller 300.

According to the various embodiments, the control UI may be displayed on the electronic apparatus 100 or the external apparatus 200 in the arrangement structure of the button included by the controller 300 as it is.

Also, according to the various embodiments, the control UI may be displayed on the electronic apparatus 100 or the external apparatus 200 while the arrangement structure of the button included by the controller 300 is partially changed. This is because the sizes of the electronic apparatus 100 and the external apparatus 200 are different from each other. In case the control UI is displayed as it is without the UI information corresponding to the controller 300 being changed, there is a problem that the user may be inconvenienced due to the arrangement or the size of the control UI.

Accordingly, the electronic apparatus 100 or the external apparatus 200 may display the control UI with the UI information of the controller 300 partially changed. The UI displayed on the electronic apparatus 100 may be described as the first control UI 10, and the UI displayed on the external apparatus 200 may be described as the second control UI 20.

The controller 300 may be described as a remote control device, a joystick, a game pad, a manipulation pen, etc.

Figure 3:
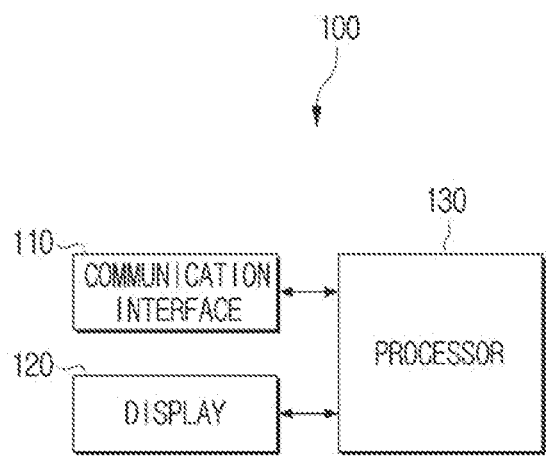
FIG. 3 is a block diagram illustrating an electronic apparatus according to one or more embodiments of the disclosure.

FIG. 3 is a block diagram illustrating the electronic apparatus 100 according to one or more embodiments of the disclosure.

Referring to FIG. 3, the electronic apparatus 100 may include at least one of a communication interface 110, a display 120, or at least one processor 130.

The electronic apparatus 100 may include various apparatuses including a display. The electronic apparatus 100 may be an electronic board, a TV, a desktop PC, a laptop computer, a smartphone, a tablet PC, a server, etc. However, the aforementioned examples are merely examples for describing the electronic apparatus 100, and the electronic apparatus 100 is not necessarily limited to the aforementioned apparatuses.

The at least one processor 130 may perform overall control operations of the electronic apparatus 100. Specifically, the at least one processor 130 performs a function of controlling the overall operations of the electronic apparatus 100.

The at least one processor 130 may include at least one of the communication interface 110 for communicating with the external apparatus 200, the display 120, or the at least one processor 130.

If content is output on the display 120, the at least one processor 130 may transmit information corresponding to a user interface (UI) related to control of the content to the external apparatus 200 through the communication interface 110, and control the display 120 to output the first control UI together with the content based on the first UI information corresponding to the UI. If a user input is received through the second control UI output on the external apparatus 200 based on the information corresponding to the UI, the at least one processor 130 may control the display 120 to output a guide UI in an input location corresponding to the user input together with the content and the first control UI based on the first UI output location of the first control UI, the second UI output location of the second control UI, and input information corresponding to the user input. The at least one processor 130 may output the guide UI to be overlapped with the first control UI.

Information corresponding to the UI may be described as UI information. A user input may be described as a touch input. Information corresponding to a user input may be described as touch information. A location corresponding to a user input may be described as a location corresponding to touch information or a touch location.

The at least one processor 130 may display content on the display 120. The content may be selected by the user, or selected according to a predetermined control command. The content may include image frames, and may be provided to the user through the display 120 of the electronic apparatus 100.

The content may be content using the user's manipulation. Also, a content may be a content of which detailed features (image information, audio information, etc.) are changed based on the user's manipulation. For example, a content may mean a game or an education content. However, a content is not limited thereto, and may mean various types of content using the user's manipulation. Also, content may be described as an application.

For manipulating content, the controller 300 for manipulating the content may be needed. The controller 300 may mean a dedicated controller or a joystick for manipulating content. The controller 300 may be described as a remote control device. When the controller 300 is connected to the electronic apparatus 100, the at least one processor 130 may receive a user input from the controller 300.

The at least one processor 130 may manipulate content based on a user input. An operation of manipulating content may mean an operation of changing an image (or an object) included in the content based on a user input. For example, if a user input is received through the controller 300, the at least one processor 130 may display a screen wherein a character in a game was moved based on the user input. The controller 300 may be a control device including at least one physical button.

The at least one processor 130 may identify whether an output (or selected) content needs the controller 300. In case the content needs the controller 300, the at least one processor 130 may identify UI information corresponding to the controller 300.

The UI information may include information related to at least one physical button included in the controller 300. The UI information may include at least one of the shape, the location, the area, the size, the color, or the transparency of the button (or the element). The area may indicate the area information that will be described with reference to FIG. 15. The area information may be included only in some cases, and may not be included in some UI information.

In case the dedicated controller 300 is not connected to content, the at least one processor 130 may manipulate the content through the external apparatus 200. The external apparatus 200 may include a display. The external apparatus 200 may display the second control UI 20 on the display of the external apparatus 200 based on the UI information received from the electronic apparatus 100.

The at least one processor 130 may display at least one of the first control UI 10 or the guide UI 30 on the display 120. The first control UI 10 and the guide UI 30 may be UIs providing a touch location input through the second control UI 20 output on the external apparatus 200.

The first control UI 10 may include a UI related to the button corresponding to the controller 300. Also, the first control UI 10 may be a UI displayed on the electronic apparatus 100. At least one example related to the first control UI 10 will be described with reference to FIG. 8.

The second control UI 20 may include a UI related to the button corresponding to the controller 300. Also, the second control UI 20 may be a UI displayed on the external apparatus 200. At least one example related to the second control UI 20 will be described with reference to FIG. 12 and FIG. 13.

The guide UI 30 may be a UI for notifying a touch location of the user. Also, the guide UI 30 may be a UI displayed on the electronic apparatus 100. At least one example related to the guide UI 30 will be described with reference to FIG. 6 and FIG. 7. For example, the guide UI 30 may be an image (or an icon) indicating a fingerprint of the user.

The external apparatus 200 may receive a user input through the output second control UI 20. The external apparatus 200 may transmit information (or touch information) related to the user input to the electronic apparatus 100.

The at least one processor 130 may receive the information (or the touch information) related to the user input through the external apparatus 200, and display the guide UI 30 in a location corresponding to the user input.

The at least one processor 130 may identify the location corresponding to the user input (or the location corresponding to the touch information) based on the output location (or the location information) of the first control UI 10, the output location (or the location information) of the second control UI 20, and the touch location (or the location information) included in the touch information.

The output location of the first control UI 10 may be the location (or the coordinate) where the first control UI 10 was output on the display of the electronic apparatus 100.

The output location of the second control UI 20 may be the location (or the coordinate) where the second control UI 20 was output on the display of the external apparatus 200.

The touch location included in the touch information may mean a location (or a coordinate) where the user's touch was identified on the display of the external apparatus 200.

According to the various embodiments, the at least one processor 130 may acquire the output location of the second control UI 20 before the touch information is received.

Also, according to the various embodiments, the at least one processor 130 may receive (or acquire) the output location of the second control UI 20 from the external apparatus 200 together with the touch information.

The at least one processor 130 may acquire relative location information of the user input based on the output location of the second control UI 20 and the touch location. The relative location information may include information indicating in which location the user input was input with reference to a specific button.

Also, the relative location information may include distance values of each of the upper side, the lower side, the left side, and the right side of the specific button. For example, the relative location information may include information indicating that the user input was input on 1 cm on the left side and 1 cm on the lower side of the first button.

Further, the relative location information may include an angle and a distance value based on the specific button. For example, the relative location information may include information indicating that the user input was input on root 2 (1.414 . . . ) cm in 225 degrees relative to the first button.

The at least one processor 130 may display the guide UI 30 based on the output location of the first control UI 10 and the relative location information. The at least one processor 130 may determine the location where the guide UI 30 will be displayed as a location that is distanced as much as the value included in the relative location information based on the output location of the first control UI. The at least one processor 130 may display the guide UI 30 in the determined location.

According to the various embodiments, the display size of the first control UI 10 and the display size of the second control UI 20 may be different. The at least one processor 130 may identify a scaling factor in consideration of the display size of the first control UI 10 and the display size of the second control UI 20.

The at least one processor 130 may display the guide UI 30 based on the output location of the first control UI 10, the relative location information, and the scaling factor. The at least one processor 130 may multiply the relative location information with the scaling factor, and acquire the scaled relative location information. The at least one processor 130 may determine the location where the guide UI 30 will be displayed based on the output location of the first control UI 10 and the scaled relative location information. The at least one processor 130 may display the guide UI 30 in the determined location.

The UI information may be first UI information. The first UI information may include information related to at least one UI indicating the button included in the controller 300. The information related to the UI may include at least one of the shape, the location, the size, the color, or the transparency of the button of the UI.

For example, the controller 300 may include four direction keys and four function keys. The controller 300 may include eight buttons in total. The first UI information may include information related to the UI indicating each of the eight buttons included in the controller 300.

The at least one processor 130 may identify the first control UI information corresponding to content among the plurality of first UI information.

According to the various embodiments, the first UI information may be information corresponding to content. The at least one processor 130 may identify the first UI information corresponding to a selected content (or content that is being displayed). In a mapping table, content and the first UI information corresponding to the content may be mapped. The mapping table may include the first UI information corresponding to each of a plurality of content. The at least one processor 130 may identify the first UI information corresponding to the content based on the mapping table.

Also, according to the various embodiments, the first UI information may be information corresponding to the controller 300. The at least one processor 130 may identify the controller 300 corresponding to a selected content (or content that is being displayed), and identify the first UI information corresponding to the identified controller 300. In the mapping table, content, a controller corresponding to the content, and the first UI information corresponding to the controller may be mapped. The mapping table may include information on controllers corresponding to each of a plurality of content and the first UI information corresponding to each of the controllers. The at least one processor 130 may identify the first UI information corresponding to the content based on the mapping table.

The mapping table may be stored in at least one of the electronic apparatus 100, a server providing a service in the electronic apparatus 100, or a server providing content.

The at least one processor 130 may acquire the second UI information based on the first UI information and the size information of the external apparatus 200 through the communication interface 110, and transmit the second UI information to the external apparatus 200 through the communication interface 110.

The first UI information includes information related to a control UI for manipulating content, but may include only information that is not in consideration of the size of the display. The first UI information may not include information indicating in which location of the display the control UI is displayed.

The at least one processor 130 may acquire new UI information (the second UI information) such that the first UI information corresponding to the content can be appropriately displayed on the external apparatus 200. The at least one processor 130 may acquire the second UI information by reflecting the size information of the external apparatus 200 to the first UI information. The second UI information may include at least one of the shape, the location, the size, the color, or the transparency of the button.

The second UI information may include information indicating the location of the button (or the location information). The location of the button may be information determined in consideration of the size information of the external apparatus 200. The size information of the external apparatus 200 may include the size of the display of the external apparatus 200.

The at least one processor 130 may transmit the second UI information to the external apparatus 200. The external apparatus 200 may receive the second UI information from the electronic apparatus 100. The external apparatus 200 may display the second control UI 20 based on the location of the button included in the second UI information.

According to the various embodiments, the at least one processor 130 may transmit the first UI information to the external apparatus 200. The external apparatus 200 may acquire the second UI information based on the first UI information and the size information of the external apparatus 200.

The at least one processor 130 may acquire the third UI information based on the first UI information and the size information of the electronic apparatus 100, and control the display 120 to output the first control UI together with the content based on the third UI information.

The at least one processor 130 may acquire new UI information (the third UI information) such that the first UI information corresponding to the content can be appropriately displayed on the electronic apparatus 100. The at least one processor 130 may acquire the third UI information by reflecting the size information of the electronic apparatus 100 to the first UI information. The third UI information may include at least one of the shape, the location, the size, the color, or the transparency of the button.

The third UI information may include information indicating the location of the button (or the location information). The location of the button may be information determined in consideration of the size information of the electronic apparatus 100. The size information of the electronic apparatus 100 may include the size of the display of the electronic apparatus 100.

If a user input is received through the second control UI output on the external apparatus 200 based on the second UI information, the at least one processor 130 may acquire the output location of the first control UI based on the third UI information, acquire the output location of the second control UI based on the second UI information, and acquire information corresponding to the user input based on information corresponding to the user input.

If the touch information is received through the second control UI 20 output on the external apparatus 200 based on the second UI information, the at least one processor 130 may identify the output location of the first control UI 10 based on the third UI information, identify the output location of the second control UI 20 based on the second UI information, and identify the touch location based on the touch information.

The third UI information may include information indicating the location where the button is displayed on the display 120 of the electronic apparatus 100. The at least one processor 130 may identify the location where the first control UI 10 is displayed included in the third UI information.

The second UI information may include information indicating the location where the button is displayed on the display of the external apparatus 200. The at least one processor 130 may identify the location where the second control UI 20 is displayed included in the second UI information.

The touch information may include information indicating the location where the user input (the touch input) is acquired (the touch location). The at least one processor 130 may identify the touch location included in the touch information.

The at least one processor 130 may identify the location where the guide UI 30 will be displayed on the display 120 of the electronic apparatus 100 based on the second UI information, the third UI information, and the touch information.

The at least one processor 130 may identify the location where the guide UI 30 will be displayed based on the output location of the second control UI 20 acquired from the second UI information, the output location of the first control UI 10 acquired from the third UI information, and the touch location.

According to the various embodiments, the at least one processor 130 may acquire the output location (or the location information) of the first control UI 10, and the output location (or the location information) of the second control UI 20 in a form of separate information which is not the second UI information and the third UI information. The at least one processor 130 may acquire the first location information indicating the output location of the first control UI 10. Also, the at least one processor 130 may acquire the second location information indicating the output location of the second control UI 20.

The at least one processor 130 may control the display 120 to output at least one of the first control UI or the guide UI together with the content (or to be overlapped with the content) based on the predetermined transparency.

The content displayed on the display 120 may be an image viewed by the user. The first control UI 10 and the guide UI 30 may be UIs output while the content is being displayed on the display 120. Accordingly, the first control UI 10 and the guide UI 30 should not interfere with the user's act of viewing the content. The at least one processor 130 may adjust the transparency of at least one of the first control UI 10 or the guide UI 30, and display it on the display 120.

The at least one processor 130 may display the first control UI 10 based on the first transparency, and display the guide UI 30 based on the second transparency.

According to the various embodiments, the first transparency and the second transparency may be identical.

Also, according to the various embodiments, the first transparency and the second transparency may be different.

Further, according to the various embodiments, the first transparency may be higher than the second transparency. The service provided to the user by the electronic apparatus 100 is notifying a touch location of the user correctly. Accordingly, the at least one processor 130 may display the first control UI 10 and the guide UI 30 by setting the second transparency to be lower than the first transparency such that the guide UI 30 can be displayed more clearly than the first control UI 10.

If a user input for changing the location of the first control UI is received, the at least one processor 130 may control the display 120 to output the first control UI in the location corresponding to the user input.

The location where the first control UI 10 is displayed by the initial setting may be inconvenient for the user. The user may change the output first control UI 10. If a user input is received, the at least one processor 130 may display the first control UI 10 in the location corresponding to the user input.

The at least one processor 130 may display the first control UI 10 in the second location corresponding to the user input instead of the initially set first location. If the location of the first control UI 10 is changed, the location where the guide UI 30 is displayed may also be automatically changed. This is because the guide UI 30 is displayed based on the button and the relative location information of the user input.

The at least one processor 130 may determine the output location of the first control UI 10 according to a user input.

According to the various embodiments, if a user input is received before the first control UI 10 is initially displayed, the at least one processor 130 may display the first control UI 10 in the location corresponding to the user input.

Also, according to the various embodiments, if a user input is received after the first control UI 10 is displayed in the first location, the at least one processor 130 may display the first control UI 10 in the second location corresponding to the user input. The at least one processor 130 may change the output location of the first control UI 10 from the first location to the second location.

In addition, according to the various embodiments, if a user input for changing the size of the first control UI 10 is received, the at least one processor 130 may display the first control UI 10 in a size corresponding to the user input.

Further, according to the various embodiments, the at least one processor 130 may display the first control UI 10 based on at least one of the content type or the content situation (or the content state).

The at least one processor 130 may display the first control UI 10 based on at least one of the size corresponding to the content type or the location corresponding to the content type.

For example, if the content type is a sport, the at least one processor 130 may display the first control UI 10 based on the first size (or the first location). Meanwhile, if the content type is a first-person shooter (FPS), the at least one processor 130 may display the first control UI 10 based on the second size (or the second location).

The at least one processor 130 may display the first control UI 10 based on at least one of the size corresponding to the content situation or the location corresponding to the content situation.

For example, if the content situation is a battle situation, the at least one processor 130 may display the first control UI 10 based on the first size (or the first location). Meanwhile, if the content situation is a non-battle situation, the at least one processor 130 may display the first control UI 10 based on the second size (or the second location). The at least one processor 130 may analyze whether it is a battle situation based on the content.

If a user input for changing the location of the first control UI is received, the at least one processor 130 may control the display 120 to output the first control UI in a location corresponding to the user input.

The at least one processor 130 may identify the location of the external apparatus 200, and display the first control UI 10 in a location corresponding to the location of the external apparatus 200 through the display 120.

The at least one processor 130 may identify the location of the external apparatus 200.

According to the various embodiments, the at least one processor 130 may receive location information of the external apparatus 200 from the external apparatus 200. The at least one processor 130 may determine a location where the first control UI 10 will be displayed based on the received location information of the external apparatus 200.

Also, according to the various embodiments, the at least one processor 130 may identify the location of the external apparatus 200 based on a photographed image acquired through the camera 190. The photographed image may include the external apparatus 200.

Detailed explanation regarding an operation of determining an output location of the first control UI 10 in relation to the location of the external apparatus 200 will be described with reference to FIG. 9.

The at least one processor 130 may acquire the location of the external apparatus 200, and control the display 120 to output the first control UI in a location corresponding to the location of the external apparatus 200.

The at least one processor 130 may display the first control UI 10 while excluding some buttons among a plurality of buttons included in the UI information (the first UI information) through the display 120.

The first UI information may include information related to the plurality of buttons (information related to the UI). The at least one processor 130 may display the first control UI 10 including only information related to some buttons among the plurality of buttons included in the first UI information.

Some buttons may also be described as main buttons (or main keys). The plurality of buttons may be divided into main buttons and general buttons.

The at least one processor 130 may acquire the third UI information including information related to some buttons among the plurality of buttons included in the first UI information. The at least one processor 130 may display the first control UI 10 including only some buttons based on the third UI information.

For example, in case a UI corresponding to twelve buttons exists in the first UI information, the at least one processor 130 may display the first control UI 10 including a UI corresponding to five buttons.

Some buttons may be buttons predetermined as main buttons. In a general situation, the at least one processor 130 may display all buttons. If a predetermined event is identified, the at least one processor 130 may display some buttons (or main buttons).

The predetermined event may be identified based on communication strength. Detailed explanation in this regard will be described with reference to FIG. 10.

According to the various embodiments, the at least one processor 130 may identify the main buttons based on at least one of the content type or the content situation.

The at least one processor 130 may identify the main buttons corresponding to the content type. The at least one processor 130 may identify the main buttons based on a mapping table related to the main buttons corresponding to the content type.

The at least one processor 130 may identify the main buttons based on the content situation. The at least one processor 130 may identify the main buttons based on a mapping table related to the main buttons corresponding to the content situation.

According to the various embodiments, the at least one processor 130 may identify buttons which have high possibility for selection as the main buttons based on at least one of the content type or the content situation.

Also, according to the various embodiments, the at least one processor 130 may identify the main buttons based on selection history information regarding the buttons. The at least one processor 130 may identify buttons of which ratios of the number of times of selection are greater than or equal to a threshold ratio (e.g., 20%) among the plurality of buttons as the main buttons.

Further, according to the various embodiments, the at least one processor 130 may display the first control UI 10 by emphasizing some (main) buttons among the plurality of buttons included in the first control UI 10. The at least one processor 130 may display the first control UI 10 by emphasizing at least one of the shape, the size, the color, or the transparency regarding the main buttons. For example, as the method of emphasizing, there may be a method of displaying the sizes of the buttons to be bigger than the general buttons, a method of displaying the buttons in a predetermined color (e.g., red), a method of displaying the buttons in transparency lower than the general buttons, etc.

The at least one processor 130 may display the first control UI 10 by emphasizing some (main) buttons among the plurality of buttons based on content that is being executed. As at least one example, the at least one processor 130 may determine whether to emphasize some buttons based on at least one of the content type, the content state, or an application for executing the content. The content type may mean the type of content provided by the electronic apparatus 100. For example, the content type may mean a game, a movie, news, a sport, a documentary, a drama, music, etc.

The content state may mean the situation of content provided by the electronic apparatus 100. For example, the content state may mean a state wherein content is being streamed in real time, a state wherein content is called from prestored data, content reproduced in a specific mode, etc. The specific mode may be a mode wherein a predetermined UI different from the basic UI is provided to the user in reproducing or providing content.

An application for executing content may mean an application that is used in providing the content through the electronic apparatus 100. For example, an application for executing content may mean a video reproduction application, a music reproduction application, a game application, etc.

The at least one processor 130 may determine a button to be emphasized based on at least one of the content type, the content state, or an application for executing the content, and display the first control UI 10 by emphasizing the determined button.

The at least one processor 130 may determine a button that has high possibility for selection as a button to be emphasized. The at least one processor 130 may store the user's button selection history. The at least one processor 130 may determine a button that was selected the most as a button to be emphasized based on the user's button selection history. The user's button selection history may be stored differently depending on content. The electronic apparatus 100 may store first history information related to the first content and second history information related to the second content.

As at least one example, content may be a game content. The at least one processor 130 may determine a button to be emphasized based on at least one of the game type or the game state, and display the first control UI 10 by emphasizing the determined button.

If a user input is received through the second control UI 20 output on the external apparatus 200, the at least one processor 130 may control the display 120 to output the guide UI by changing the color based on whether a location corresponding to the user input is included in the predetermined area.

If touch information is received through the second control UI 20 output on the external apparatus 200, the at least one processor 130 may identify whether the touch location is included in the predetermined area, and output the guide UI 30 by changing the color through the display 120 based on the identification result.

A user input may be received through the second control UI 20 output on the external apparatus 200. If the user touches a specific location of the display of the external apparatus 200, the external apparatus 200 may determine whether the user's touch location selected a specific button included in the second control UI 20.

According to the various embodiments, the electronic apparatus 100 may determine whether a touch location selected a specific button. For determining whether the user selected a specific button, a predetermined area related to the specific button may exist. If a touch location is included in the predetermined area, the at least one processor 130 may determine that the specific button was selected.

The predetermined area related to the specific button may include a plurality of areas. The predetermined area may include at least one of a button area, a subsidiary button area, or an extensible area.

The button area may be an area wherein it is identified that the button is selected.

The subsidiary button area may be an area wherein the button was not selected by the button area, but it is preliminarily recognized that the button was selected in consideration of the user intent. The subsidiary button area may be changed.

The extensible area may mean an area wherein the subsidiary button area can be extended. If a user input is received in the extensible area, the at least one processor 130 identifies that the user touched the surrounding area of the button, but the button was not ultimately selected.

If a touch location is included in the button area of the first button or the subsidiary button area of the first button, the at least one processor 130 may determine that the user selected (or touched) the first button.

If a touch location is included in the button area of the first button, the at least one processor 130 may display the guide UI 30 in the first color.

If a touch location is included in the subsidiary button area of the first button, the at least one processor 130 may display the guide UI 30 in the second color.

If a touch location is included in the extensible area of the first button, the at least one processor 130 may display the guide UI 30 in the third color.

According to the various embodiments, all of the first color, the second color, and the third color may be different colors.

Also, according to the various embodiments, the first color and the second color may be different, and the first color and the third color may be different.

Further, according to the various embodiments, if a touch location is included in the button area of the first button, the at least one processor 130 may not display the guide UI 30. In case the user touched the button area, a separate guide UI 30 may not be needed.

Detailed explanation regarding the predetermined area will be described with reference to FIG. 15. A plurality of predetermined areas corresponding to one button will be described with reference to FIG. 15. A plurality of predetermined areas corresponding to each of a plurality of buttons will be described with reference to FIG. 16. Explanation regarding the feature of displaying the guide UI 30 in different formats according to in which area a touch location is included will be described with reference to FIG. 23.

According to the various embodiments, the external apparatus 200 may determine whether a touch location selected a specific button. In the aforementioned explanation, it was described that an operation of comparing a touch location and the predetermined area is performed in the electronic apparatus 100. However, the subject of the described operation may be changed from the electronic apparatus 100 to the external apparatus 200.

If information corresponding to a plurality of user inputs is received within a predetermined time through the second control UI output on the external apparatus 200, the at least one processor 130 may transmit a signal for controlling the output location of the second control UI based on an input pattern acquired based on the information corresponding to the plurality of user inputs to the external apparatus 200 through the communication interface 110.

Also, if a plurality of touch information is received within a threshold time through the second control UI 20 output on the external apparatus 200, the at least one processor 130 may identify an input pattern (or a touch pattern) based on the plurality of touch information, generate a control signal for changing the output location of the second control UI 20 based on the input pattern, and transmit a control signal to the external apparatus 200 through the communication interface 110.

The at least one processor 130 may change the output location of the second control UI 20 based on an input pattern. The at least one processor 130 may receive consecutive user inputs received within a threshold time.

The at least one processor 130 may acquire a plurality of touch information related to consecutive user inputs received within a threshold time. The at least one processor 130 may determine whether a predetermined input pattern is identified based on the plurality of touch information.

The predetermined input pattern may be a pattern that a touch location selecting a specific button moves in a specific direction. Also, the predetermined input pattern may be a pattern that the location of a user input moves in the order of the button area, the subsidiary button area, and the extensible area.

For example, consecutive user inputs may be the first user input, the second user input, and the third user input. If an event wherein the first user input is identified in the button area, the second user input is identified in the subsidiary button area, and the third user input is identified in the extensible area is identified, the electronic apparatus 100 may determine that the predetermined input pattern was identified.

If the predetermined input pattern is identified, the at least one processor 130 may determine the output location of the second control UI 20 based on the touch location of the most recent user input. The at least one processor 130 may generate a control signal for the second control UI 20 to be displayed in the determined output location. The at least one processor 130 may transmit the generated control signal to the external apparatus 200. The external apparatus 200 may receive the control signal from the electronic apparatus 100, and display the second control UI 20 in the determined output location.

The electronic apparatus 100 according to the various embodiments may guide a correct touch location by displaying the guide UI 30. The user may intuitively recognize that a manipulation through the external apparatus 200 is incorrect through the guide UI 30 or the color of the guide UI 30.

In the aforementioned explanation, it was described that various operations are performed through the electronic apparatus 100. However, some operations among the aforementioned operations may be performed in the electronic apparatus 100, and some other operations may be performed at an external server.

According to the various embodiments, the electronic apparatus 100 may be an apparatus outputting the first control UI 10 and the guide UI 30, and a specific determining operation may be performed at the external server.

Figure 19:
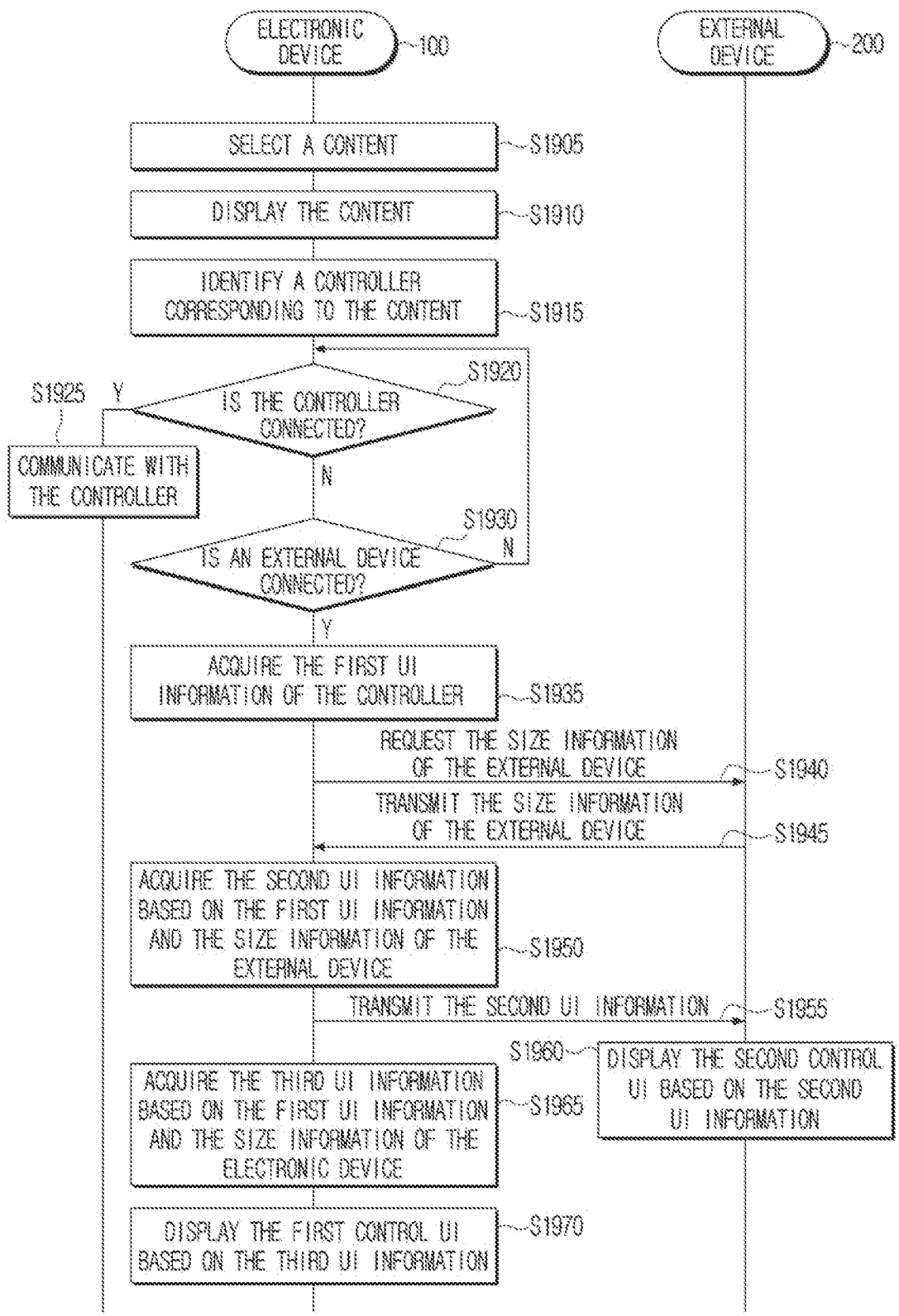
FIG. 19 is a flow chart for illustrating a second control UI displayed on an electronic apparatus and a third control UI displayed on an external apparatus.

For example, referring to the operations in FIG. 19, the operations S1905, S1910, S1920, S1925, S1930, S1940, S1945, S1955, and S1970 may be performed in the electronic apparatus 100. The operations S1915, S1935, S1950, and S1965 may be performed at the external server. The electronic apparatus 100 and the external server may be communicatively connected, and transmit information for each operation to each other.

According to the various embodiments, the electronic apparatus 100 may control content based on a user voice acquired through the microphone.

As at least one example, the microphone may be included in the electronic apparatus 100.

Also, as at least one example, the microphone may be included in the external apparatus 200. If a user voice is acquired through the microphone, the external apparatus 200 may transmit the user voice to the electronic apparatus 100. A game user may easily input a voice by using the microphone of the external apparatus 200 without using the microphone connected to the electronic apparatus 100.

The electronic apparatus 100 may analyze the acquired user voice, and acquire information corresponding to the user voice (e.g., text information). The electronic apparatus 100 may control content based on information corresponding to the user voice. Also, the electronic apparatus 100 may control content based on an audio signal including a user voice.

As at least one example, the electronic apparatus 100 may change the setting related to content provision based on information corresponding to a user voice. The electronic apparatus 100 may change at least one of the brightness, the resolution, or the sound size of content based on a user voice.

As at least one example, the electronic apparatus 100 may change an object included in content based on information corresponding to a user voice. The electronic apparatus 100 may change the locations or the exterior of an object, a UI, etc., included in content based on a user voice.

As at least one example, the electronic apparatus 100 may perform an input operation regarding a chatting function provided in content based on a text corresponding to a user voice. If the user utters a voice which is "Hello, friend," the electronic apparatus 100 may input text information corresponding to "Hello, friend" into the chatting UI. The electronic apparatus 100 may transmit text information corresponding to "Hello, friend" to content server (or an external server) providing content chatting function. The content server may receive the text information and generate a chatting screen, and transmit content including the generated chatting screen to the electronic apparatus 100 again. The electronic apparatus 100 may receive the content including the generated chatting screen and display it.

Figure 4:
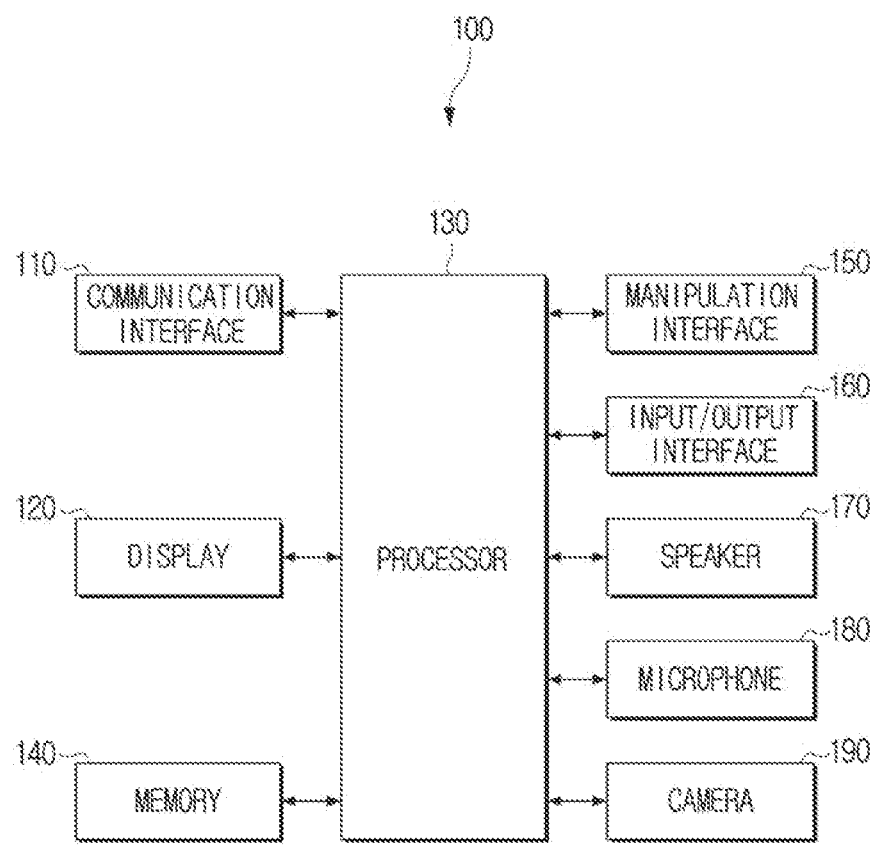
FIG. 4 is a block diagram for illustrating a detailed configuration of the electronic apparatus in FIG. 3.

FIG. 4 is a block diagram for illustrating a detailed configuration of the electronic apparatus 100 in FIG. 3.

Referring to FIG. 4, the electronic apparatus 100 may include at least one of a communication interface 110, a display 120, at least one processor 130, at least one memory 140, a manipulation interface 150, an input/output interface 160, a speaker 170, a microphone 180, or a camera 190.

The communication interface 110 is a component that performs communication with various types of external apparatuses according to various types of communication methods. The communication interface 110 may include a wireless communication module or a wired communication module. Each communication module may be implemented in a form of at least one hardware chip.

A wireless communication module may be a module that communicates with an external apparatus wirelessly. For example, a wireless communication module may include at least one module among a Wi-Fi module, a Bluetooth module, an infrared communication module, or another communication module.

A Wi-Fi module and a Bluetooth module may perform communication by a Wi-Fi method and a Bluetooth method, respectively. In the case of using a Wi-Fi module or a Bluetooth module, various types of connection information such as a service set identifier (SSID) and a session key, etc. is transmitted and received first, and connection of communication is performed by using the information, and various types of information can be transmitted and received thereafter.

An infrared communication module performs communication according to an infrared Data Association (IrDA) technology of transmitting data to a near field wirelessly by using infrared rays between visible rays and millimeter waves.

The another communication module may include at least one communication chip that performs communication according to various wireless communication standards such as Zigbee, 3rd Generation (3G), 3rd Generation Partnership Project (3GPP), Long Term Evolution (LTE), LTE Advanced (LTE-A), 4th Generation (5G), 5th Generation (5G), etc. other than the aforementioned communication methods.

A wired communication module may be a module that communicates with an external apparatus via wire. For example, a wired communication module may include at least one of a local area network (LAN) module, an Ethernet module, a pair cable, a coaxial cable, an optical fiber cable, or an ultra wide-band (UWB) module.

According to the various embodiments, the communication interface 110 may use the same communication module (e.g., a Wi-Fi module) for communicating with an external apparatus such as a remote control apparatus and an external server.

Also, according to the various embodiments, the communication interface 110 may use different communication modules for communicating with an external apparatus such as a remote control apparatus and an external server. For example, the communication interface 110 may use at least one of an Ethernet module or a Wi-Fi module for communicating with an external server, and use a Bluetooth module for communicating with an external apparatus such as a remote control apparatus. However, this is merely one or more embodiments, and the communication interface 110 may use at least one communication module among various communication modules in the case of communicating with a plurality of external apparatuses or an external server.

The display 120 may be implemented as displays in various forms such as a liquid crystal display (LCD), an organic light emitting diodes (OLED) display, a plasma display panel (PDP), etc. In the display 120, driving circuits that may be implemented in forms such as an amorphous silicon thin film transistor (a-si TFT), a low temperature poly silicon (LTPS) TFT, an organic TFT (OTFT), etc., a backlight unit, etc. may also be included together. The display 120 may also be implemented as a touch screen combined with a touch sensor, a flexible display, a three-dimensional (3D) display, etc. The display 120 according to one or more embodiments of the disclosure may include not only a display panel outputting images, but also a bezel housing the display pane. In particular, a bezel according to one or more embodiments of the disclosure may include a touch sensor for detecting user interactions.

The at least one processor 130 may be implemented as a digital signal processor (DSP) processing digital signals, a microprocessor, and a time controller (TCON). However, the disclosure is not limited thereto, and the at least one processor 130 may include one or more of a central processing unit (CPU), a micro controller unit (MCU), a micro processing unit (MPU), a controller, an application processor (AP), a graphics-processing unit (GPU) or a communication processor (CP), and an advanced reduced instruction set computer (RISC) machines (ARM) processor, or may be defined by the terms. Also, the processor 130 may be implemented as a system on chip (SoC) having a processing algorithm stored therein, or large scale integration (LSI), or in the form of a field programmable gate array (FPGA). The at least one processor 130 may perform various functions by executing computer executable instructions stored in the memory.

The memory 140 may be implemented as an internal memory such as a ROM (e.g., an electrically erasable programmable read-only memory (EEPROM)), a RAM, etc. included in the processor 130, or implemented as a separate memory from the processor 130. In this case, the memory 140 may be implemented in a form of a memory embedded in the electronic apparatus 100, or in a form of a memory that can be attached to or detached from the electronic apparatus 100, according to the usage of stored data. For example, in the case of data for operating the electronic apparatus 100, the data may be stored in a memory embedded in the electronic apparatus 100, and in the case of data for an extended function of the electronic apparatus 100, the data may be stored in a memory that can be attached to or detached from the electronic apparatus 100.

In the case of a memory embedded in the electronic apparatus 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). In the case of a memory that can be attached to or detached from the electronic apparatus 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

The memory 140 may store at least one instruction. The processor 130 may perform various operations based on the instructions stored in the memory 140.

The manipulation interface 150 may be implemented as a device such as a button, a touch pad, a mouse, and a keyboard, or implemented as a touch screen that can perform both of the aforementioned display function and a manipulation input function together. Here, a button may be various types of buttons such as a mechanical button, a touch pad, a wheel, etc. formed in any areas such as the front surface part, the side surface part, the rear surface part, etc. of the exterior of the main body of the electronic apparatus 100.

The input/output interface 160 may be any one interface among a high definition multimedia interface (HDMI), a mobile high-definition link (MHL), a universal serial bus (USB), a display port (DP), a Thunderbolt, a video graphics array (VGA) port, an RGB port, a D-subminiature (D-SUB), or a digital visual interface (DVI). The input/output interface 160 may input or output at least one of an audio signal or a video signal. Depending on implementation examples, the input/output interface 160 may include a port inputting and outputting only audio signals and a port inputting and outputting only video signals as separate ports, or may be implemented as one port that inputs and outputs both audio signals and video signals. The electronic apparatus 100 may transmit at least one of an audio signal or a video signal to an external apparatus (e.g., an external display apparatus or an external speaker) through the input/output interface 160.

Specifically, an output port included in the input/output interface 160 may be connected with an external apparatus, and the electronic apparatus 100 may transmit at least one of an audio signal or a video signal to the external apparatus through the output port.

The input/output interface 160 may be connected to the communication interface. The input/output interface 160 may transmit information received from an external apparatus to the communication interface, or transmit information received through the communication interface to the external apparatus.

The speaker 170 may be a component outputting not only various kinds of audio data but also various kinds of notification sounds or voice messages, etc.

The microphone 180 is a component for receiving an input of a user voice or other sounds, and converting them into audio data. The microphone 180 may receive a user's voice in an activated state. For example, the microphone 180 may be formed as an integrated type integrated to the upper side or the front surface direction, the side surface direction, etc. of the electronic apparatus 100. The microphone 180 may include various components such as a microphone collecting a user voice in an analogue form, an amp circuit amplifying the collected user voice, an A/D conversion circuit that samples the amplified user voice and converts the user voice into a digital signal, a filter circuit that removes noise components from the converted digital signal, etc.

The camera 190 is a component for photographing a subject and generating a photographed image, and here, a photographed image is a concept including both of a moving image and a still image. The camera 190 may acquire an image regarding at least one external apparatus, and may be implemented as a camera, a lens, an infrared sensor, etc.

The camera 190 may include a lens and an image sensor. As types of a lens, there are general generic-purpose lenses, wide-angle lenses, zoom lenses, etc., and the type may be determined according to the type, the characteristic, the use environment, etc. of the electronic apparatus 100. As an image sensor, a complementary metal oxide semiconductor (CMOS) and a charge coupled device (CCD), etc. may be used.

According to the various embodiments, the electronic apparatus 100 may include a display 120. Specifically, the electronic apparatus 100 may directly display an acquired image or content on the display 120.

Also, according to the various embodiments, the electronic apparatus 100 may not include a display 120. The electronic apparatus 100 may be connected with an external display apparatus, and transmit an image or content stored in the electronic apparatus 100 to the external display apparatus.

The electronic apparatus 100 may transmit an image or content to the external display apparatus together with a control signal for controlling such that the image or the content is displayed on the external display apparatus. The external display apparatus may be connected with the electronic apparatus 100 through the communication interface 110 or the input/output interface 160. For example, the electronic apparatus 100 may not include a display like a set top box (STB).

The electronic apparatus 100 may include only a small size display that can display only simple information such as text information. The electronic apparatus 100 may transmit an image or content to the external display apparatus via wire or wirelessly through the communication interface 110, or transmit them to the external display apparatus through the input/output interface 160.

There may be various embodiments wherein the electronic apparatus 100 performs an operation corresponding to a user voice signal received through the microphone 180.

According to the various embodiments, the electronic apparatus 100 may control the display 120 based on a user voice signal received through the microphone 180. For example, if a user voice signal for displaying an A content is received, the electronic apparatus 100 may control the display 120 to display the A content.

Also, according to the various embodiments, the electronic apparatus 100 may control the external display apparatus connected with the electronic apparatus 100 based on a user voice signal received through the microphone 180. Specifically, the electronic apparatus 100 may generate a control signal for controlling the external display apparatus such than an operation corresponding to a user voice signal is performed in the external display apparatus, and transmit the generated control signal to the external display apparatus. The electronic apparatus 100 may store a remote control application for controlling the external display apparatus. Then, the electronic apparatus 100 may transmit the generated control signal to the external display apparatus by using at least one communication method among Bluetooth, Wi-Fi, or infrared rays. For example, if a user voice signal for displaying the A content is received, the electronic apparatus 100 may transmit a control signal for controlling such that the A content is displayed on the external display apparatus to the external display apparatus. The electronic apparatus 100 may mean various terminal apparatuses wherein a remote control application can be installed such as a smartphone, an AI speaker, etc.

In addition, according to the various embodiments, the electronic apparatus 100 may use a remote control apparatus for controlling the external display apparatus connected with the electronic apparatus 100 based on a user voice signal received through the microphone 180. Specifically, the electronic apparatus 100 may transmit a control signal for controlling the external display apparatus such that an operation corresponding to a user voice signal is performed in the external display apparatus to a remote control apparatus. Then, the remote control apparatus may transmit the control signal received from the electronic apparatus 100 to the external display apparatus. For example, if a user voice signal for displaying the A content is received, the electronic apparatus 100 may transmit a control signal for controlling such that the A content is displayed on the external display apparatus to the remote control apparatus, and the remote control apparatus may transmit the received control signal to the external display apparatus.

The electronic apparatus 100 may receive a user voice signal by various methods.

According to the various embodiments, the electronic apparatus 100 may receive a user voice signal through the microphone 180 included in the electronic apparatus 100.

Also, according to the various embodiments, the electronic apparatus 100 may receive a user voice signal from an external apparatus including a microphone. The external apparatus may mean a remote control apparatus or a smartphone, etc. The received user voice signal may be a digital voice signal, but depending on implementation examples, it may be an analogue voice signal. The electronic apparatus 100 may receive a user voice signal through a wireless communication method such as Bluetooth or Wi-Fi, etc.

The electronic apparatus 100 may convert a user voice signal by various methods.

According to the various embodiments, the electronic apparatus 100 may acquire text information corresponding to a user voice signal from an external server. Specifically, the electronic apparatus 100 may transmit a user voice signal (an audio signal or a digital signal) to an external server. The external server may mean a voice recognition server. The voice recognition server may convert the user voice signal into text information by using speech to text (STT). Then, the external server may transmit the converted text information corresponding to the user voice signal to the electronic apparatus 100.

Also, according to the various embodiments, the electronic apparatus 100 may acquire text information corresponding to a user voice signal by itself. Specifically, the electronic apparatus 100 may convert a digital voice signal into text information by directly applying a speech to text (STT) function, and transmit the converted text information to the external server.

The external server may transmit information to the electronic apparatus 100 by various methods.

According to the various embodiments, the external server may transmit text information corresponding to a user voice signal to the electronic apparatus 100. Specifically, the external server may be a server performing a voice recognition function of converting a user voice signal into text information.

Also, according to the various embodiments, the external server may transmit at least one of text information corresponding to a user voice signal or search result information corresponding to the text information to the electronic apparatus 100. Specifically, the external server may be a server performing a search result provision function of providing search result information corresponding to text information other than the voice recognition function of converting a user voice signal into text information. As at least one example, the external server may be a server performing both of the voice recognition function and the search result provision function. As another example, the external server may perform only the voice recognition function and the search result provision function may be performed at a separate server. The external server may transmit text information to the separate server for acquiring a search result, and acquire the search result corresponding to the text information from the separate server.

The electronic apparatus 100 may be communicatively connected with an external apparatus and an external server by various methods.

According to the various embodiments, a communication module for communicating with an external apparatus and an external server may be implemented to be identical. For example, the electronic apparatus 100 may communicate with an external apparatus by using a Bluetooth module, and may also communicate with an external server by using the Bluetooth module.

Also, according to the various embodiments, communication modules for communicating with an external apparatus and an external server may be implemented to be separate. For example, the electronic apparatus 100 may communicate with an external apparatus by using a Bluetooth module, and may communicate with an external server by using an Ethernet modem or a Wi-Fi module.

Figure 5:
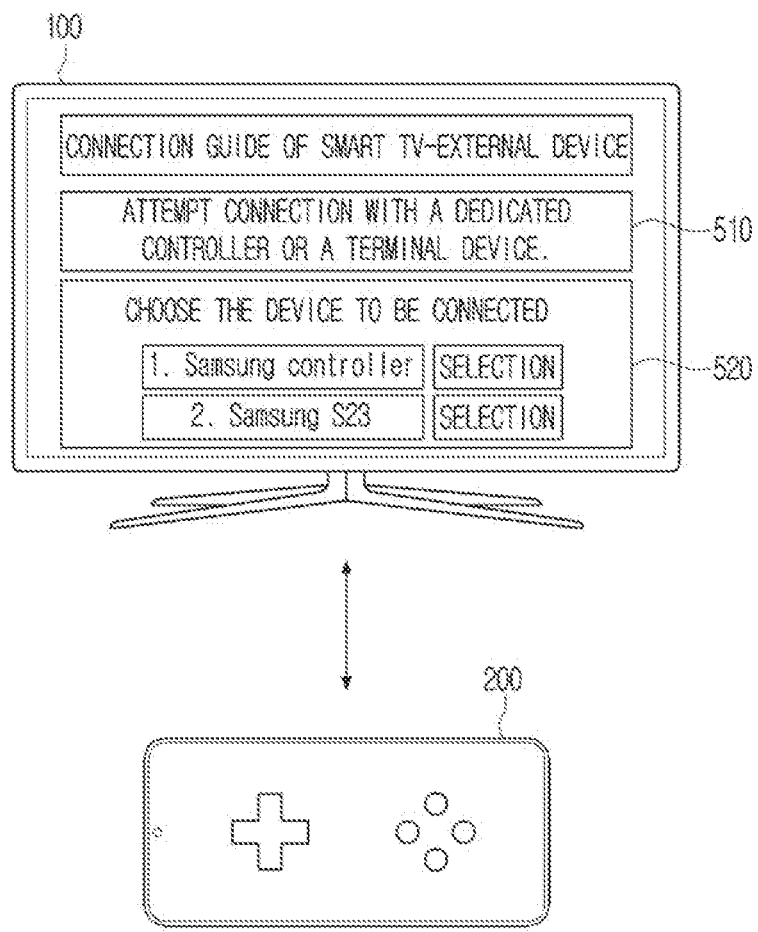
FIG. 5 is a diagram for illustrating an operation of displaying a connection guide of an electronic apparatus and an external apparatus.

FIG. 5 is a diagram for illustrating an operation of displaying a connection guide screen of the electronic apparatus 100 and the external apparatus 200.

Referring to FIG. 5, the electronic apparatus 100 may display a connection guide screen with the external apparatus related to a displayed content. If content displayed on the electronic apparatus 100 is specified (or selected), a device for manipulating the specified content may be needed. In case a dedicated controller (referred to as the controller 300 hereinafter) exists, the controller 300 should be connected with the electronic apparatus 100. Even if the controller 300 exists, in case the controller 300 is not connected to the electronic apparatus 100, the electronic apparatus 100 may display a control UI by using the external apparatus 200. The user may manipulate the content displayed on the electronic apparatus 100 by using the external apparatus 200 instead of the controller 300.

The electronic apparatus 100 may display a connection guide screen (or a guide screen) for connecting with the controller 300 or the external apparatus 200. The connection guide screen may include at least one of a UI 510 indicating that connection with the dedicated controller or the external apparatus, etc. is attempted or a UI 520 indicating a list of connectable apparatuses.

The UI 510 may include a text. Depending on implementation examples, the UI 510 may include an image, an icon, etc. indicating that connection with the controller or an external apparatus, etc. is attempted.

The UI 520 may include a list of external apparatuses that can be currently connected with the electronic apparatus 100 and a button for receiving an input of an instruction for starting connection with an external apparatus.

In the list of external apparatuses, both of the external apparatus 200 and the controller 300 may be included. If both of the external apparatus 200 and the controller 300 are included in the list of external apparatuses that can be connected with the electronic apparatus 100, the electronic apparatus 100 may preferentially display the controller 300. For example, a method of preferentially displaying an apparatus may mean a method of displaying an apparatus having priority in the uppermost area in the list of external apparatuses, or a method of displaying an apparatus having priority by emphasizing it in the predetermined color.

Figure 6:
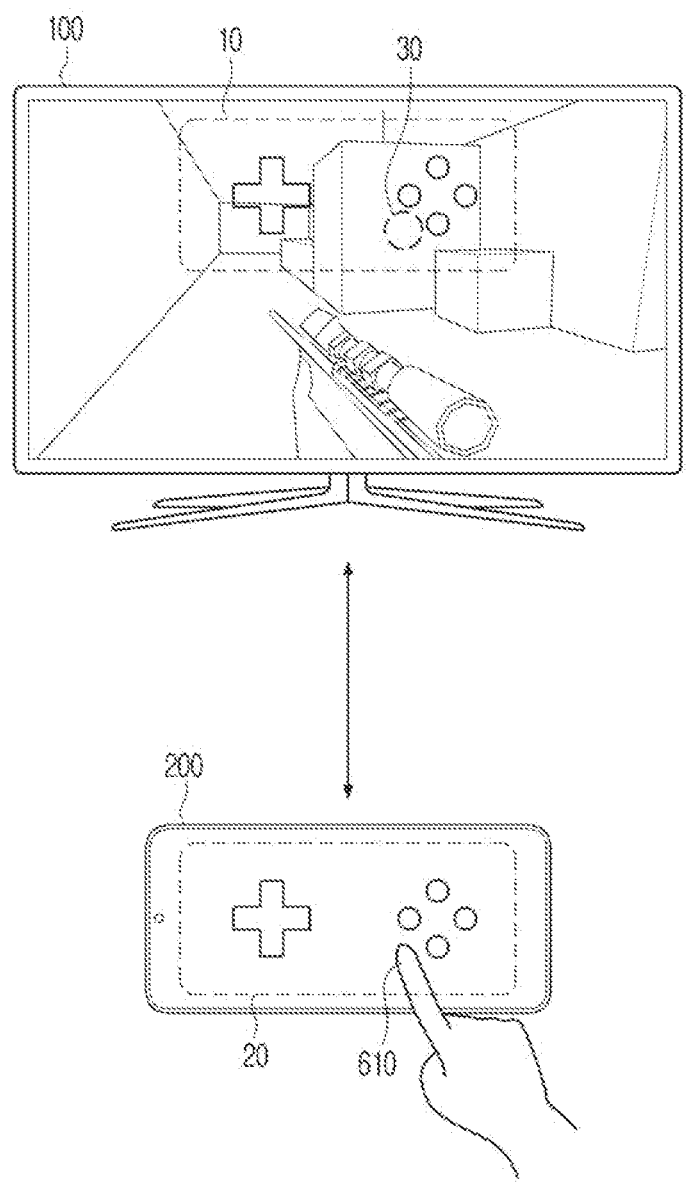
FIG. 6 is a diagram for illustrating an operation of displaying a guide UI according to a user input.

FIG. 6 is a diagram for illustrating an operation of displaying a guide UI according to a user input.

Referring to FIG. 6, the electronic apparatus 100 may display the first control UI 10, and the external apparatus 200 may display the second control UI 20. While the second control UI 20 is displayed on the external apparatus 200, the external apparatus 200 may acquire (or receive) a user input 610. When the user input 610 is received, the external apparatus 200 may transmit information related to the user input 610 (e.g., location information) to the electronic apparatus 100.

The electronic apparatus 100 may receive information related to the user input 610 and provide a guide UI 30 corresponding to the user input 610. The guide UI 30 may indicate in which location on the external apparatus 200 the user input 610 was received. The user can easily recognize a touch location through the guide UI 30.

At least one of the shape, the size, the color, or the transparency of the guide UI 30 may be changed. Also, the exterior information of the guide UI 30 may be changed based on the user's setting or content.

Figure 7:
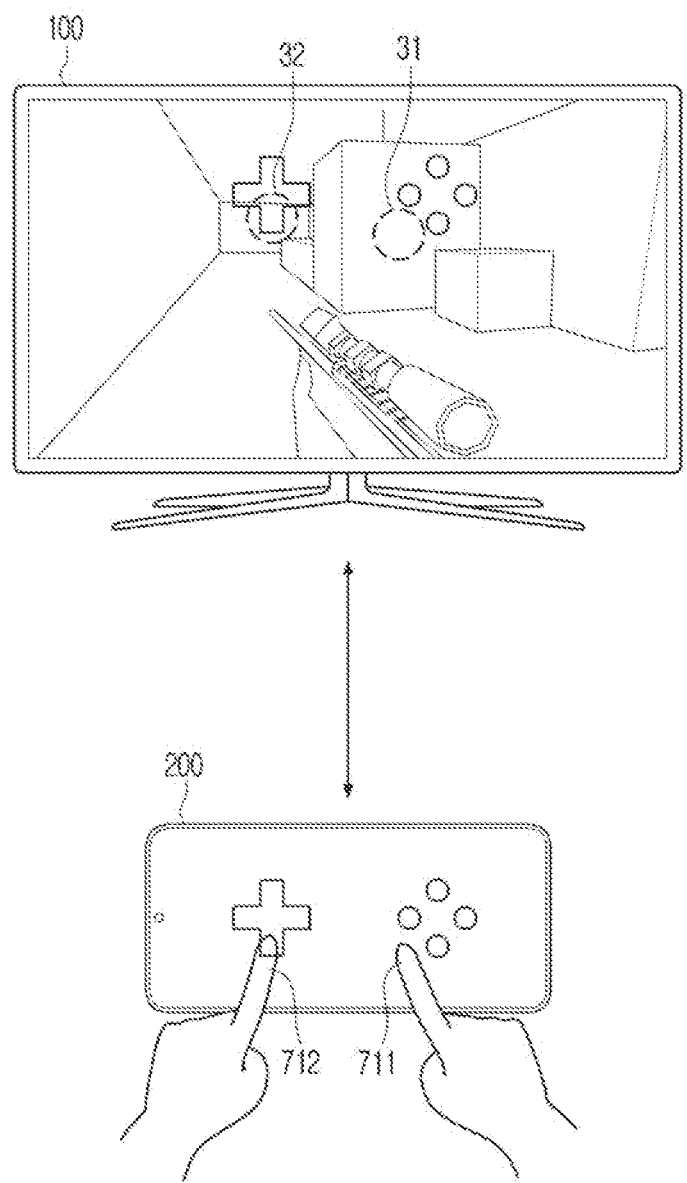
FIG. 7 is a diagram for illustrating an operation of displaying a guide UI according to a plurality of user inputs.

FIG. 7 is a diagram for illustrating an operation of displaying a guide UI according to a plurality of user inputs.

Referring to FIG. 7, the electronic apparatus 100 may display the first control UI 10, and the external apparatus 200 may display the second control UI 20. While the second control UI 20 is displayed on the external apparatus 200, the external apparatus 200 may acquire (or receive) user inputs 711, 712. When the user inputs 711, 712 are received, the external apparatus 200 may transmit information related to the user inputs 711, 712 (e.g., location information) to the electronic apparatus 100.

The electronic apparatus 100 may receive information related to the user inputs 711, 712 and display guide UIs 31, 32 corresponding to the user inputs 711, 712. The guide UIs 31, 32 may indicate in which location on the external apparatus 200 the user inputs 711, 712 were received. The user can easily recognize a touch location through the guide UIs 31, 32.

In FIG. 6 and FIG. 7, components displaying the first control UI 10 were described.

According to the various embodiments, the electronic apparatus 100 may provide the first control UI 10 only when a predetermined event is generated related to the second control UI 20. The predetermined event may be an event wherein it is determined that the user's touch was touched wrongly.

Also, the predetermined event may mean an event wherein the user does not touch a predetermined button area. Further, the predetermined event may be an event wherein the user selects at least one area among a subsidiary button area 1512, an extensible area 1513, or a remaining area 1514 on the second control UI 20.

As at least one example, if the user's touch is identified in one area among the subsidiary button area 1512, the extensible area 1513, or the remaining area 1514 on the second control UI 20, the electronic apparatus 100 may display the first control UI 10.

As at least one example, if the user's touch is identified in the subsidiary button area 1512 or the extensible area 1513, the electronic apparatus 100 may display the first control UI 10.

As at least one example, if the user's touch is identified in the subsidiary button area 1512, the electronic apparatus 100 may display the first control UI 10.

As at least one example, if the user's touch is identified in the extensible area 1513, the electronic apparatus 100 may display the first control UI 10.

The first control UI 10 may be displayed to be overlapped with content screen provided by the electronic apparatus 100. As the first control UI 10 is displayed, the user's viewing of content may be interfered to some degree. The electronic apparatus 100 may display the first control UI 10 only in a situation wherein it is determined that the user's touch is not correct. When the first control UI 10 is displayed, the user can easily recognize that a touch input should be performed correctly.

Figure 8:
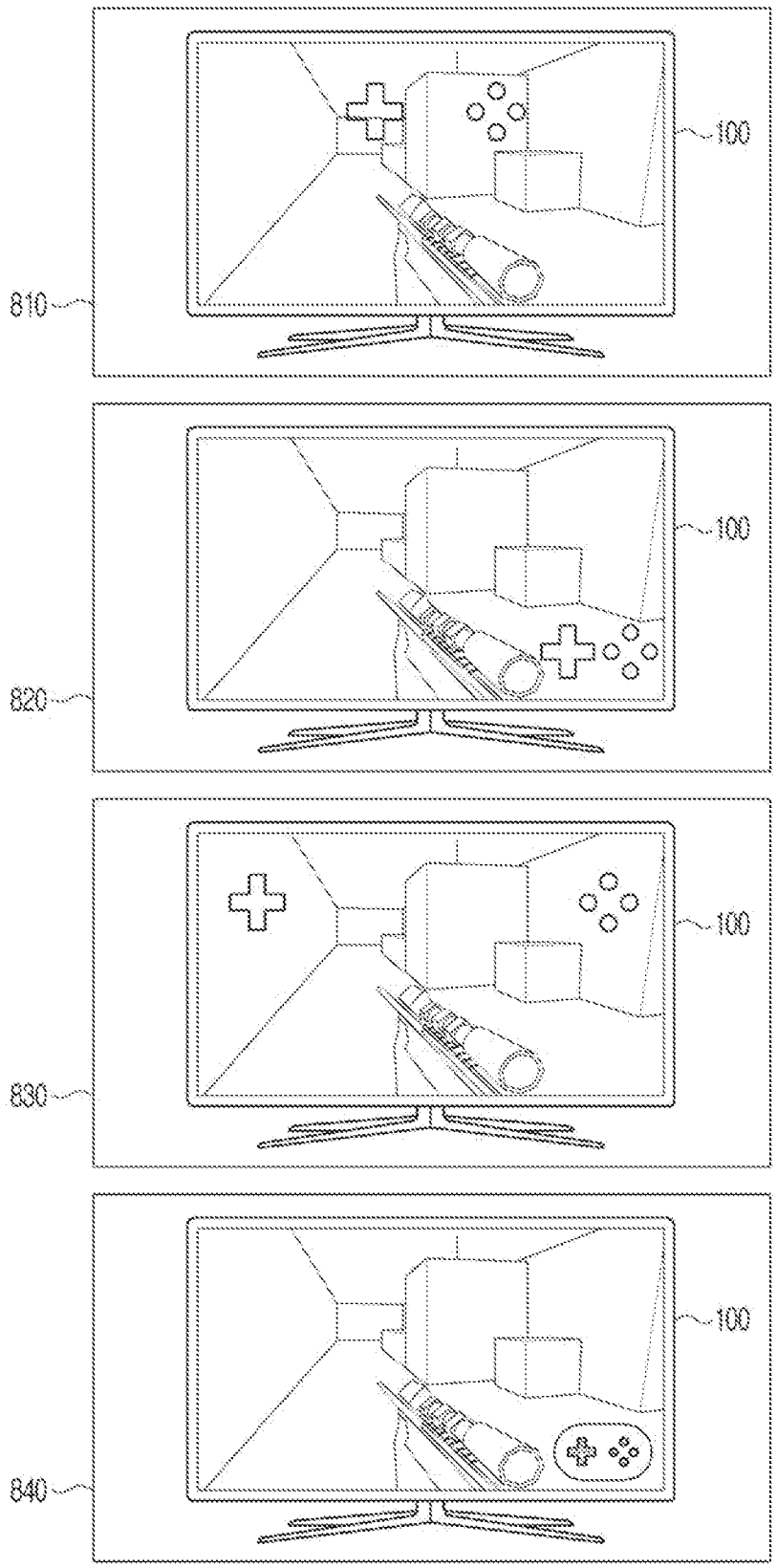
FIG. 8 is a diagram for illustrating an operation of displaying a control UI according to various embodiments.

FIG. 8 is a diagram for illustrating an operation of displaying a control UI according to various embodiments.

Referring to FIG. 8, the electronic apparatus 100 may display the first control UI 10 by various methods. The embodiments disclosed in FIG. 8 should not be restrictively interpreted, and the first control UI 10 may be displayed on the electronic apparatus 100 by other various methods. A location where the first control UI 10 is displayed may be determined based on at least one of a user input or content.

According to the embodiment 810, the electronic apparatus 100 may display the first control UI 10 in a specific area of the display 120. The specific area is a predetermined area, and it may be designated according to a predefined standard. Also, according to the embodiment 810, the electronic apparatus 100 may display the first control UI 10 while maintaining the relative locations of the buttons (the elements) included in the first UI information.

According to the embodiment 820, the electronic apparatus 100 may display the first control UI 10 by changing the relative locations of the buttons (the elements) included in the first control UI 10. Also, according to the embodiment 820 (or the embodiment 840), the electronic apparatus 100 may display the first control UI 10 by changing an interval between a moving element and a functional element (an operational element) to be narrow, unlike in the embodiment 810.

According to the embodiment 830, the electronic apparatus 100 may display the first control UI 10 by changing the relative locations of the buttons (the elements) included in the first control UI 10. Also, according to the embodiment 830, the electronic apparatus 100 may display the first control UI 10 by changing an interval between a moving element and a functional element to be wide, unlike in the embodiment 810.

An interval between a moving element and a functional element may vary based on content displayed on the electronic apparatus 100. The first control UI 10 should not interfere with the user viewing content. Accordingly, the electronic apparatus 100 may adjust an interval between a moving element and a functional element in consideration of the constitution of a screen (or an object) displayed in content.

The electronic apparatus 100 may identify an interval between a moving element and a functional element that was set based on the first UI information based on the locations (or the arrangement) of the elements. The electronic apparatus 100 may acquire the third UI information by changing the locations (or the arrangement) of the elements. Then, the electronic apparatus 100 may display the first control UI 10 wherein the interval between the moving element and the functional element became wide based on the changed third UI information.

Figure 9:
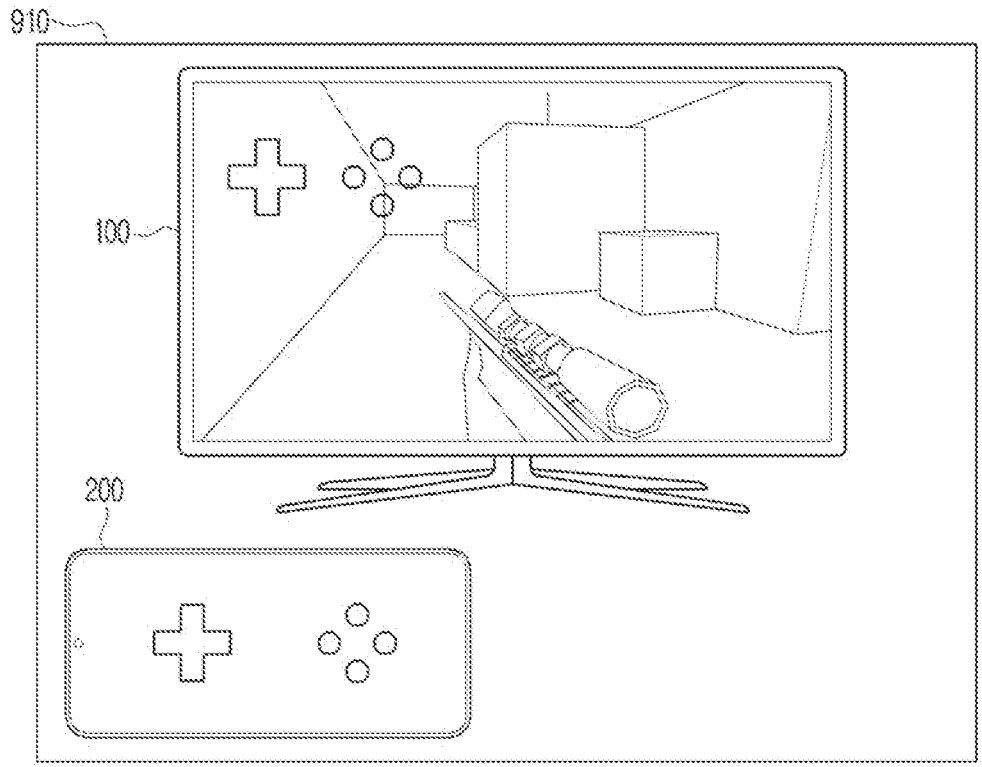
FIG. 9 is a diagram for illustrating an operation of displaying a control UI according to relative locations of an electronic apparatus and an external apparatus.
Figure 9:
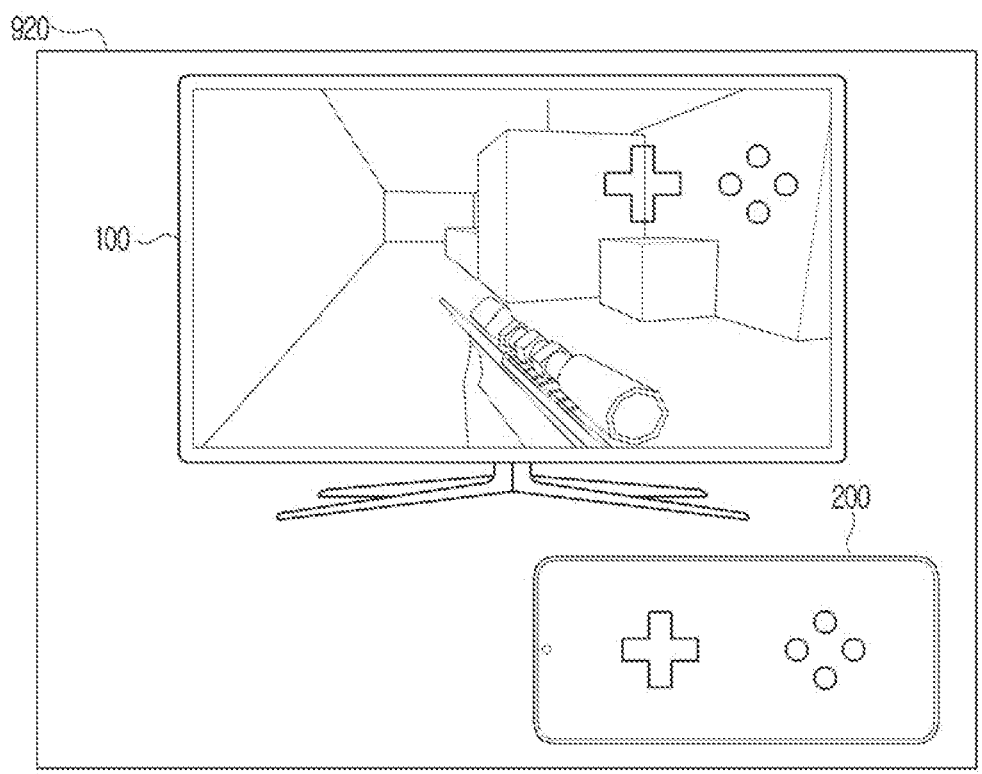

FIG. 9 is a diagram for illustrating an operation of displaying a control UI according to relative locations of the electronic apparatus 100 and the external apparatus 200.

Referring to FIG. 9, the electronic apparatus 100 may communicate with the external apparatus 200. When the electronic apparatus 100 is connected with the external apparatus 200, the electronic apparatus 100 may request the location of the external apparatus 200. The external apparatus 200 may transmit the location of the external apparatus 200 to the electronic apparatus 100 in response to the request of the electronic apparatus 100.

The electronic apparatus 100 may acquire the relative locations between the electronic apparatus 100 and the external apparatus 200 in consideration of the location of the external apparatus 200. The electronic apparatus 100 may display the first control UI 10 based on the relative location of the external apparatus 200. The electronic apparatus 100 may display the first control UI 10 based on the relative location of the external apparatus 200. The electronic apparatus 100 may display the first control UI 10 in the determined location.

Referring to the embodiment 910, if the external apparatus 200 exists on the left side (or the first side) based on a direction of facing the electronic apparatus 100, the electronic apparatus 100 may display the first control UI 10 on the left side (or the first side) of the display 120 of the electronic apparatus 100 based on the relative location of the external apparatus 200.

Referring to the embodiment 920, if the external apparatus 200 exists on the right side (or the second side) based on a direction of facing the electronic apparatus 100, the electronic apparatus 100 may display the first control UI 10 on the right side (or the second side) of the display 120 of the electronic apparatus 100 based on the relative location of the external apparatus 200.

Figure 10:
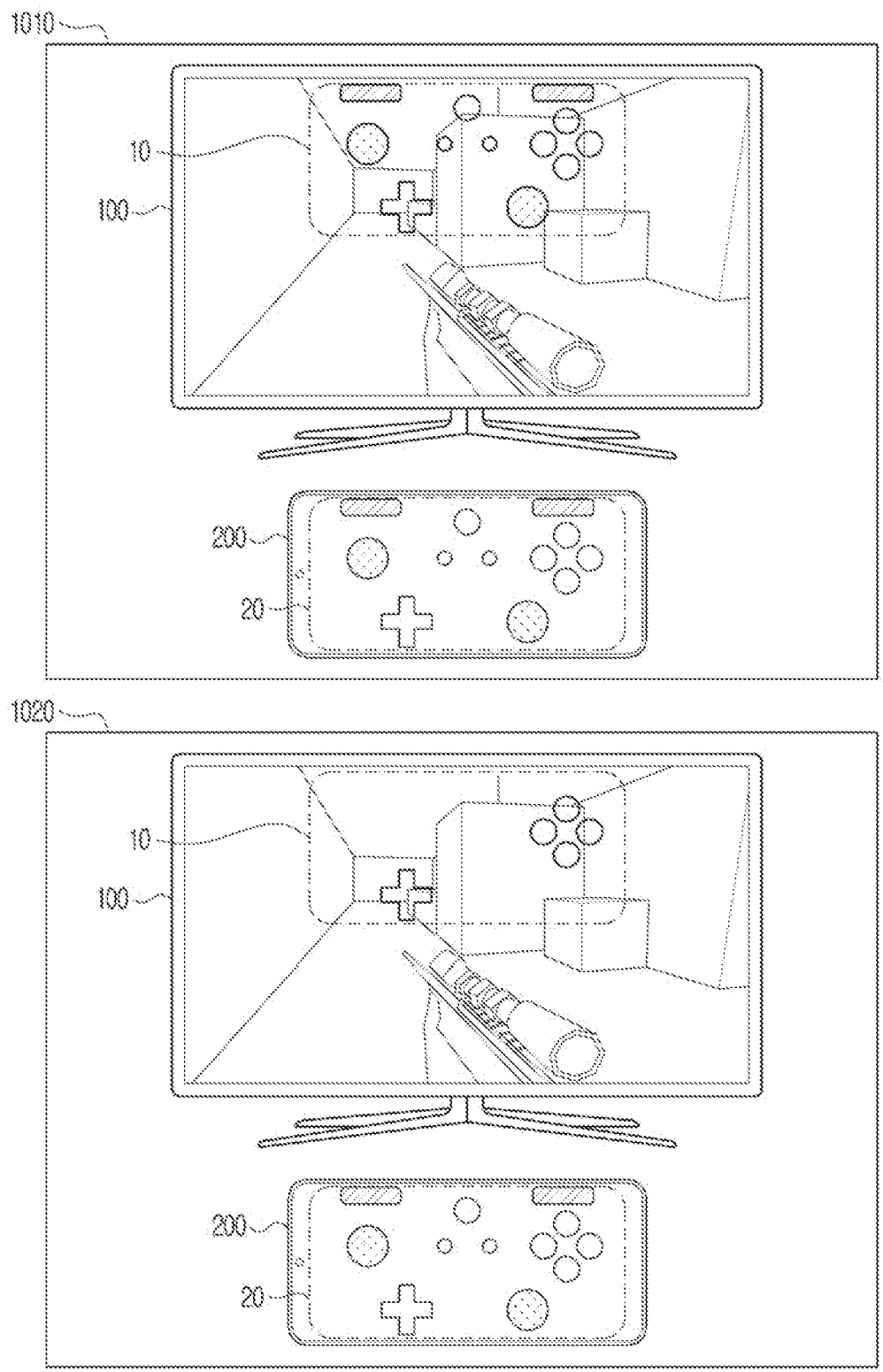
FIG. 10 is a diagram for illustrating an operation of adjusting the number of a plurality of elements included in a control UI.

FIG. 10 is a diagram for illustrating an operation of adjusting the number of a plurality of elements included in a control UI.

Referring to FIG. 10, the electronic apparatus 100 may change the number of the elements included in the first control UI 10. The elements included in the second control UI 20 and the elements included in the first control UI 10 may be different. The electronic apparatus 100 may exclude (or delete) specific elements in acquiring the third UI information.

In the first UI information of the controller, a plurality of elements may be included. In the case of receiving a user input through the external apparatus 200, the number of the plurality of elements included in the first UI information and the number of the plurality of elements included in the second control UI 20 should be identical. As the first control UI 10 is output together with content on the electronic apparatus 100, in case all of the plurality of elements are displayed, the user may feel inconvenience in viewing the content.

The electronic apparatus 100 may determine main elements (or essential elements) among the plurality of elements in the first UI information of the controller. The electronic apparatus 100 may acquire the third UI information including information related to the main elements. The electronic apparatus 100 may display the first control UI 10 based on the third UI information.

The embodiment 1010 in FIG. 10 indicates that the number of the elements included in the second control UI 20 and the number of the elements included in the first control UI 10 are identical.

The embodiment 1020 in FIG. 10 indicates that the number of the elements included in the second control UI 20 and the number of the elements included in the first control UI 10 are different. The electronic apparatus 100 may determine main elements among the plurality of elements included in the first UI information, and display the first control UI 10 including the determined main elements. According to the embodiment 1020, the electronic apparatus 100 may display the first control UI 10 including a moving element and some functional elements.

The electronic apparatus 100 may determine at least one element included in the first control UI 10 based on the communication strength (the connection strength) between the electronic apparatus 100 and the external apparatus 200. The electronic apparatus 100 may include more elements in the first control UI 10 as the communication strength is stronger.

The electronic apparatus 100 may acquire the communication strength between the electronic apparatus 100 and the external apparatus 200. The electronic apparatus 100 may determine at least one element to be included in the first control UI 10 based on the communication strength.

If the communication strength is greater than or equal to the threshold strength, the electronic apparatus 100 may display the first control UI 10 including the plurality of elements included in the first UI information as in the embodiment 1010.

If the communication strength is smaller than the threshold strength, the electronic apparatus 100 may display the first control UI 10 including the main elements among the plurality of elements included in the first UI information as in the embodiment 1020.

The number of the main elements may be a predetermined number. The number of the main elements may be changed according to the user's setting. For example, in case there are 12 basic buttons (elements) of the external apparatus 200, the electronic apparatus 100 may adjust the number of the buttons (the elements) displayed on the UI according to the communication strength. The communication strength may also be described as the connection speed.

According to one or more embodiments, if the communication strength is greater than or equal to a first threshold value, the electronic apparatus 100 may display all of the plurality of elements included in the first UI information as the first control UI 10.

Also, according to one or more embodiments, if the communication strength is smaller than the first threshold value and greater than or equal to a second threshold value, the electronic apparatus 100 may display the main elements in the predetermined first number (e.g., 12) among all of the plurality of elements included in the first UI information as the first control UI 10.

In addition, according to one or more embodiments, if the communication strength is smaller than the second threshold value and greater than or equal to a third threshold value, the electronic apparatus 100 may display the main elements in the predetermined second number (e.g., 10) among all of the plurality of elements included in the first UI information as the first control UI 10. The second number may be smaller than the first number.

Further, according to one or more embodiments, if the communication strength is smaller than the third threshold value and greater than or equal to a fourth threshold value, the electronic apparatus 100 may display the main elements in the predetermined third number (e.g., 8) among all of the plurality of elements included in the first UI information as the first control UI 10. The third number may be smaller than the second number.

Also, according to one or more embodiments, if the communication strength is smaller than the fourth threshold value, the electronic apparatus 100 may display the main elements in the predetermined fourth number (e.g., 5) among all of the plurality of elements included in the first UI information as the first control UI 10. The fourth number may be smaller than the third number.

Figure 11:
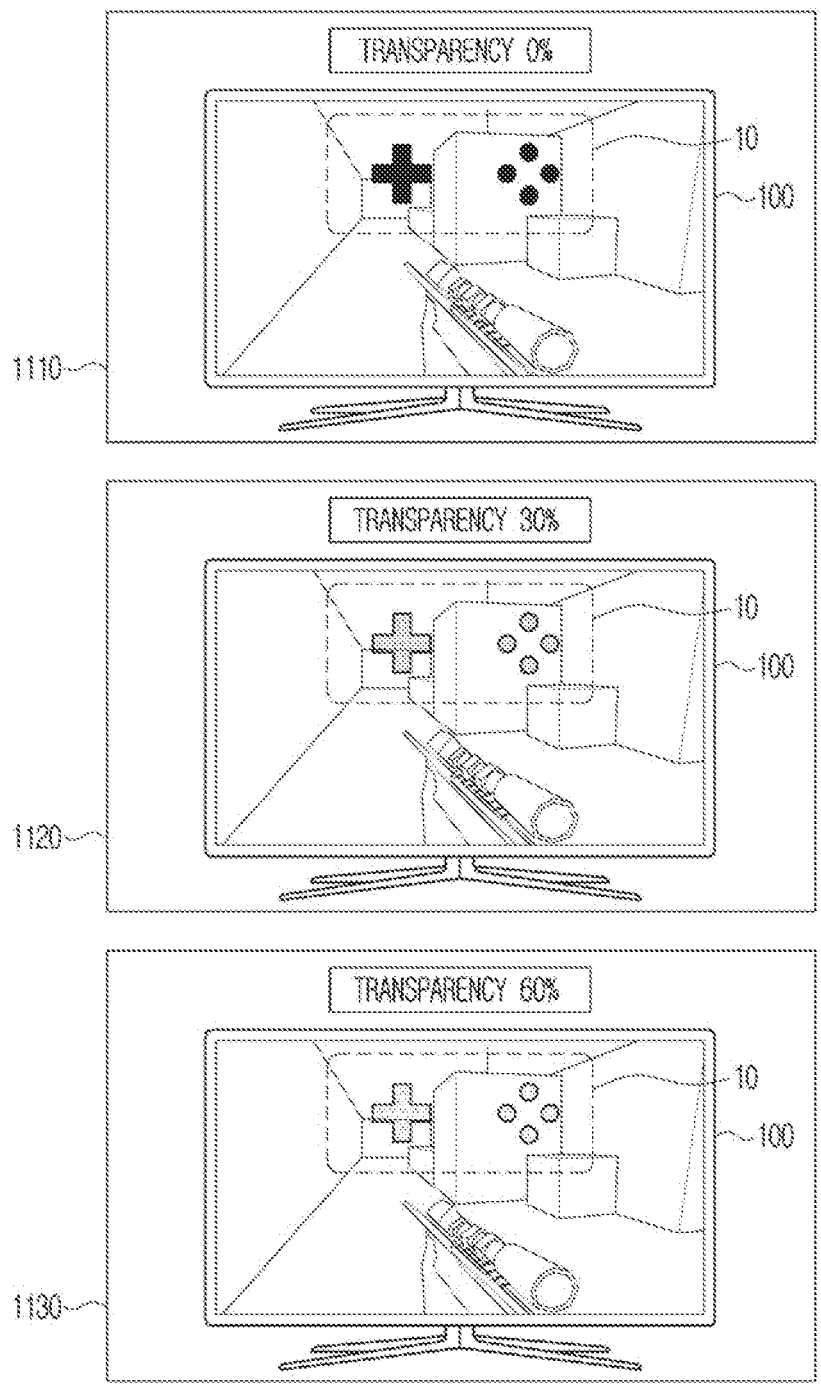
FIG. 11 is a diagram for illustrating an operation of adjusting transparency of a control UI.

The electronic apparatus 100 may adjust the number of the provided elements according to the communication strength (or the connection speed). As the number of the provided elements decreases, user inputs are limited, and thus the amount of data transmitted or received may be small. If the amount of data transmitted or received becomes small, the electronic apparatus 100 may provide the first control UI 10 to the user without disconnection even in case the communication strength is relatively weak. FIG. 11 is a diagram for illustrating an operation of adjusting transparency of a control UI.

Referring to FIG. 11, the electronic apparatus 100 may determine the transparency of the first control UI 10. The electronic apparatus 100 may determine the transparency of the first control UI 10 based on the third UI information. The electronic apparatus 100 may display the first control UI 10 together with content screen. There is a need that the electronic apparatus 100 does not interfere with the user's viewing of content. The electronic apparatus 100 may not interfere with content viewing by adjusting the transparency of the first control UI 10.

The electronic apparatus 100 may display the first control UI 10 based on the predetermined transparency. The predetermined transparency may be changed according to the user's setting.

The electronic apparatus 100 may determine the transparency based on content. The transparency corresponding to each of a plurality of content may be determined in advance. The transparency may be identified based on the first UI information corresponding to each content.

The electronic apparatus 100 may determine the transparency based on color information of content. The electronic apparatus 100 may determine the transparency based on color information of a screen provided in content. In case content screen in a relatively dark color is displayed on the electronic apparatus 100, the electronic apparatus 100 may increase the transparency. In case content screen in a relatively bright color is displayed on the electronic apparatus 100, the electronic apparatus 100 may decrease the transparency.

According to the embodiment 1110 in FIG. 11, the electronic apparatus 100 may display the first control UI 10 based on the transparency 0%.

According to the embodiment 1120 in FIG. 11, the electronic apparatus 100 may display the first control UI 10 based on the transparency 30%.

According to the embodiment 1130 in FIG. 11, the electronic apparatus 100 may display the first control UI 10 based on the transparency 60%.

Figure 12:
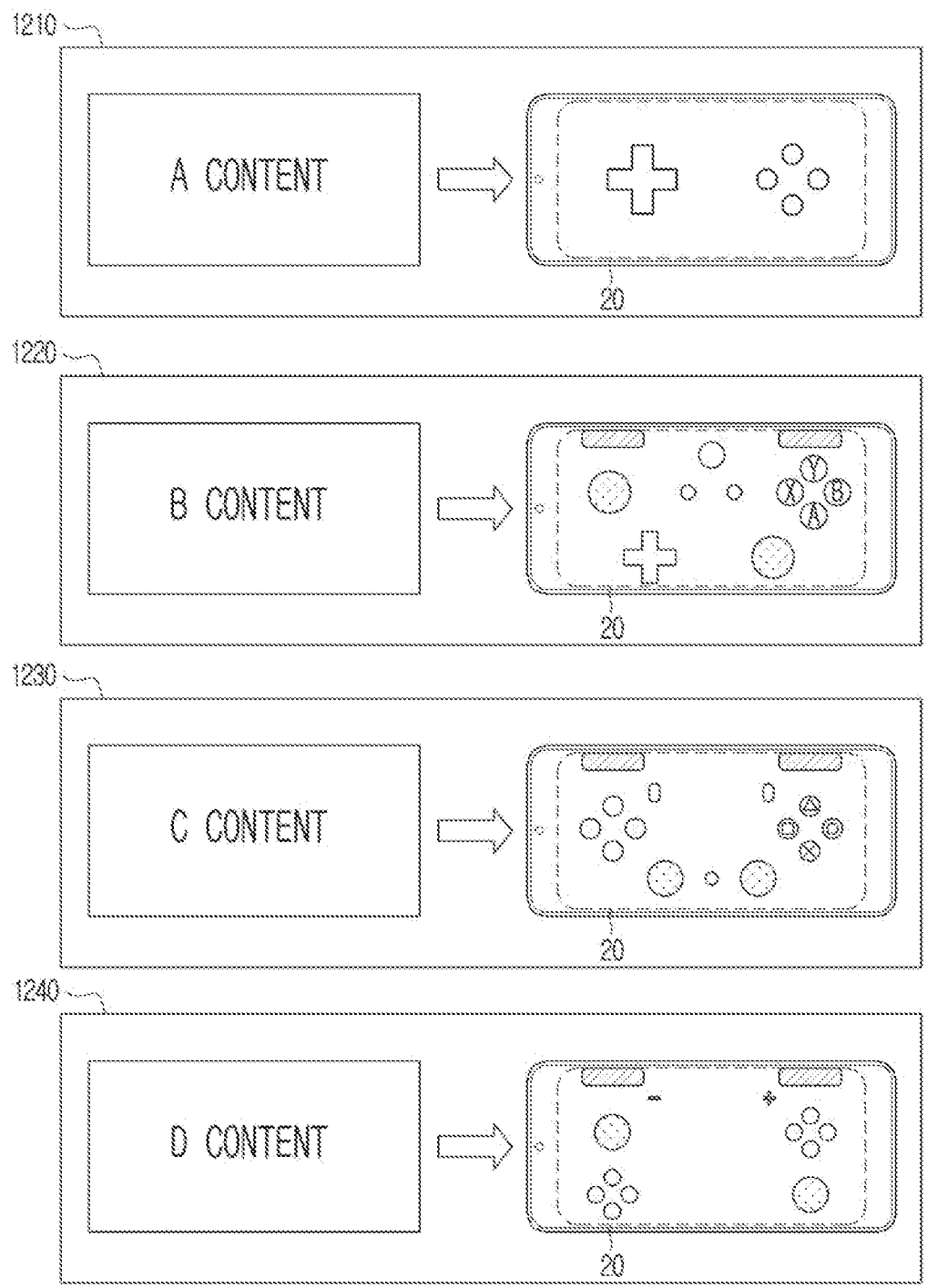
FIG. 12 is a diagram for illustrating a control UI corresponding to content according to various embodiments.

FIG. 12 is a diagram for illustrating a control UI corresponding to content according to various embodiments.

Referring to FIG. 12, the external apparatus 200 may display the second control UI 20 corresponding to content. A different control UI may exist for each content. If content provider who produced content is different, the control UI of the controller may be different. Even if the content provider is identical, if the provided content is different, the control UI of the controller may be different.

The electronic apparatus 100 may acquire the first UI information corresponding to a specific content. The electronic apparatus 100 may acquire the second UI information by changing the first UI information based on the size information of the external apparatus 200. The electronic apparatus 100 may display the second UI based on the second UI information. As the first UI information corresponding to each content is different, the second control UI 20 displayed according to content may be different.

According to the embodiment 1210 in FIG. 12, the external apparatus 200 may display the second control UI 20 corresponding to an A content.

According to the embodiment 1220 in FIG. 12, the external apparatus 200 may display the second control UI 20 corresponding to a B content.

According to the embodiment 1230 in FIG. 12, the external apparatus 200 may display the second control UI 20 corresponding to a C content.

According to the embodiment 1240 in FIG. 12, the external apparatus 200 may display the second control UI 20 corresponding to a D content.

At least one of the shape, the location, the area, the size, the color, or the transparency of the elements included in the second control UI 20 corresponding to each content may be different.

Figure 13:
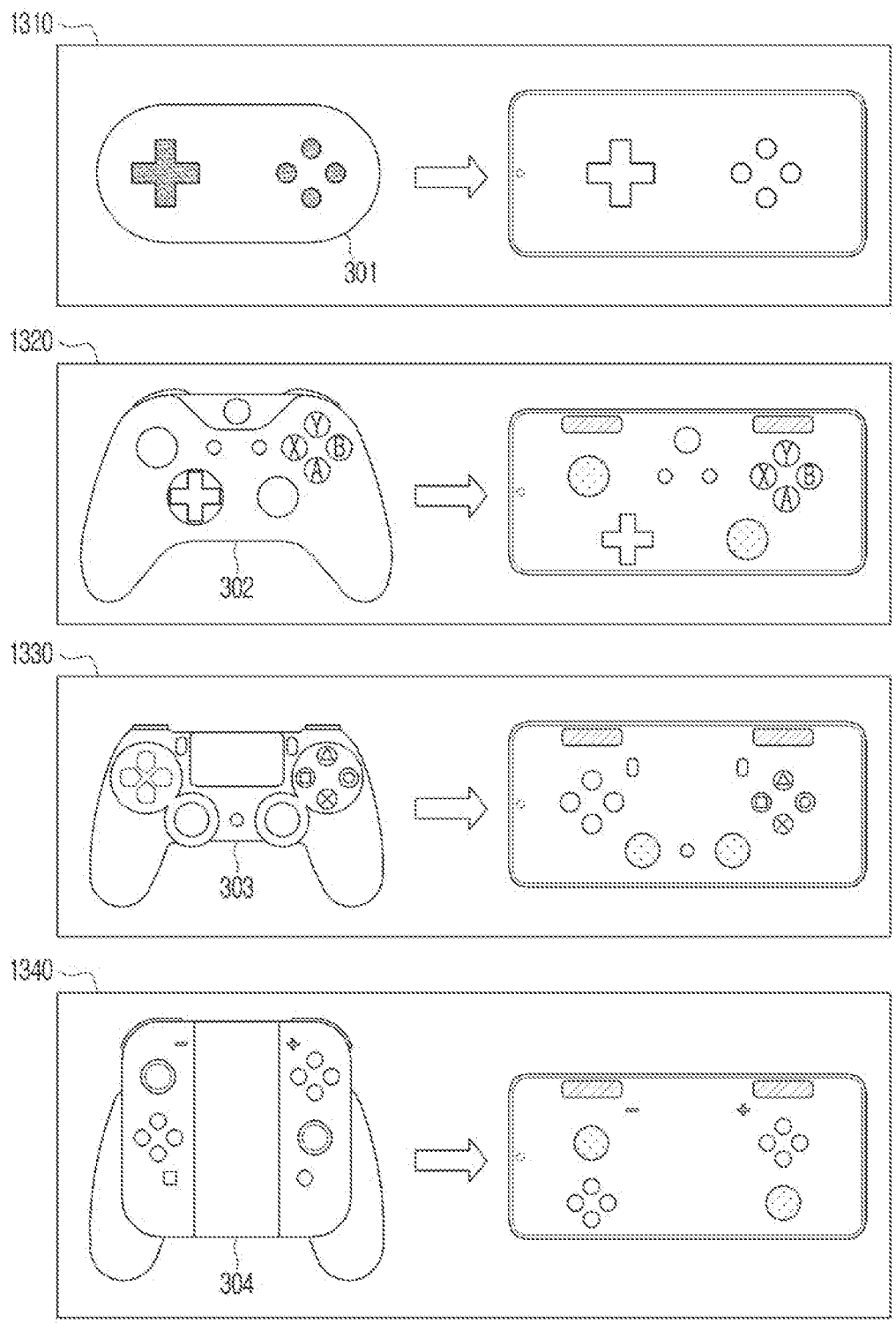
FIG. 13 is a diagram for illustrating a control UI corresponding to a controller according to various embodiments.

FIG. 13 is a diagram for illustrating a control UI corresponding to a controller according to various embodiments.

Referring to FIG. 13, the external apparatus 200 may display the second control UI 20 corresponding to the controller. In FIG. 12, it was described that the control UI is different according to content. According to another implementation example, a different control UI may exist according to the controller. If the controller is different, the control UI may also be different.

The electronic apparatus 100 may acquire the first UI information corresponding to a specific controller. The electronic apparatus 100 may acquire the second UI information by changing the first UI information based on the size information of the external apparatus 200. The electronic apparatus 100 may display the second UI based on the second UI information. As the first UI information corresponding to each content is different, the second control UI 20 displayed according to content may also be different.

According to the embodiment 1310 in FIG. 13, the external apparatus 200 may display the second control UI 20 corresponding to the controller 301.

According to the embodiment 1320 in FIG. 13, the external apparatus 200 may display the second control UI 20 corresponding to the controller 302.

According to the embodiment 1330 in FIG. 13, the external apparatus 200 may display the second control UI 20 corresponding to the controller 303.

According to the embodiment 1340 in FIG. 13, the external apparatus 200 may display the second control UI 20 corresponding to the controller 304.

Figure 14:
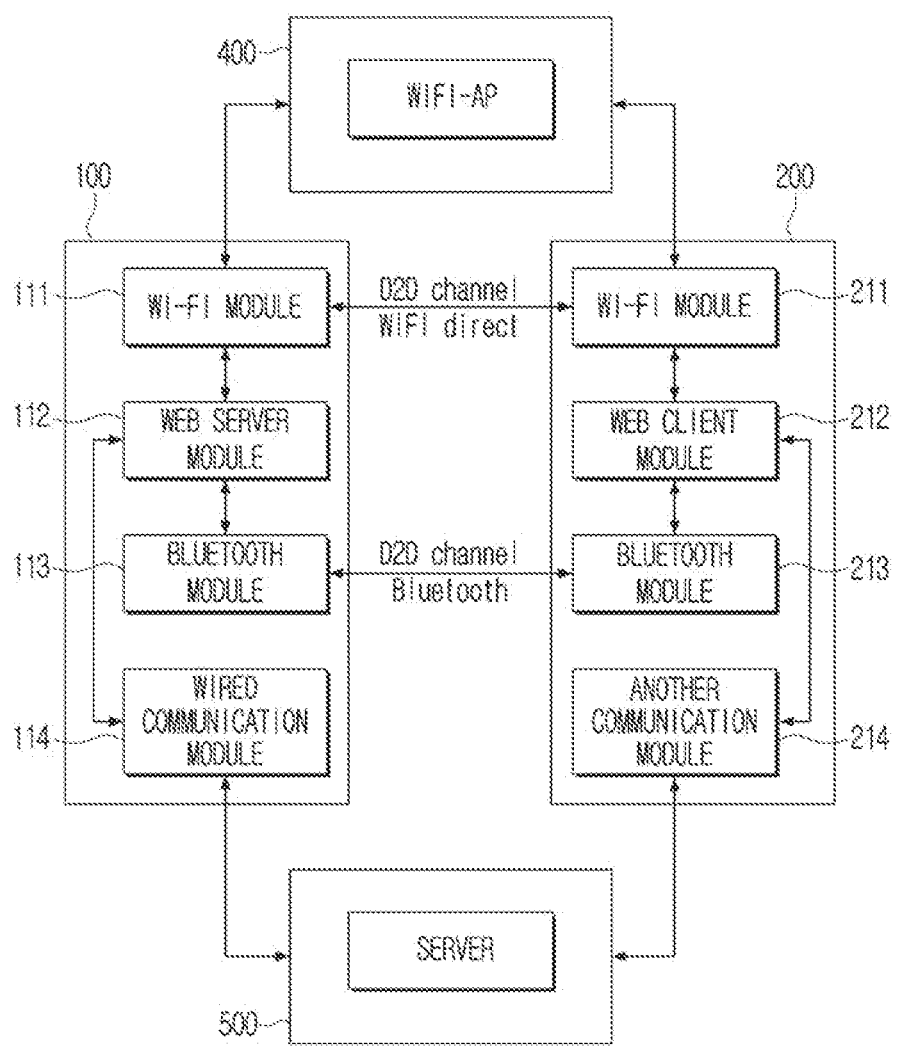
FIG. 14 is a diagram for illustrating a communication method between an electronic apparatus and an external apparatus.

FIG. 14 is a diagram for illustrating a communication method between the electronic apparatus 100 and the external apparatus 200.

Referring to FIG. 14, the electronic apparatus 100 and the external apparatus 200 may be connected according to various communication methods.

The electronic apparatus 100 and the external apparatus 200 may be connected through an access point (AP) device 400. The AP device 400 may mean a router.

The electronic apparatus 100 may include at least one of a Wi-Fi module 111, a web server module 112, a Bluetooth module 113, or a wired communication module 114. The Wi-Fi module 111, the web server module 112, the Bluetooth module 113, the wired communication module 114, etc. may be included in the communication interface 110 of the electronic apparatus 100.

The external apparatus 200 may include a Wi-Fi module 211, a web client module 212, a Bluetooth module 213, and another communication module 214.

According to the various embodiments, the electronic apparatus 100 and the external apparatus 200 may be connected with the AP device 400 by using the Wi-Fi modules 111, 211.

Also, according to the various embodiments, the electronic apparatus 100 and the external apparatus 200 may perform Wi-Fi direct communication by using the Wi-Fi modules 111, 211. In addition, the electronic apparatus 100 and the external apparatus 200 may generate a Device to Device (D2D) channel.

The web server module 112 may be a module that performs and manages a function of providing information requested by the external apparatus 200 (or information to be transmitted to the external apparatus 200) statically or as an operation. The web server module 112 may also be described as a web server application. The web server module 112 may include a component file (e.g., an HTML file, a java script file, an image file, etc.). The web server module 112 may communicate with the external apparatus 200 based on at least one of the Wi-Fi module 111, the Bluetooth module 113, or the wired communication module 114.

The web client module 212 may be a module that performs and manages a function of requesting specific information to the electronic apparatus 100 (or receiving specific information from the electronic apparatus 100). The web client module 212 may also be described as a web client application. The web client module 212 may communicate with the electronic apparatus 100 based on at least one of the Wi-Fi module 211, the Bluetooth module 213, or the another communication module 214.

The web server module 112 may be implemented as at least one of hardware or software. Also, the web client module 212 may be implemented as at least one of hardware or software.

The Bluetooth modules 113, 213 may connect communication between the electronic apparatus 100 and the external apparatus 200 by using Bluetooth.

According to the various embodiments, the electronic apparatus 100 and the external apparatus 200 may perform Bluetooth communication by using the Bluetooth modules 113, 213. The electronic apparatus 100 and the external apparatus 200 may generate a Device to Device (D2D) channel.

The wired communication module 114 may be a module that communicates with an external apparatus via wire. For example, the wired communication module 114 may include at least one of a local area network (LAN) module, an Ethernet module, a pair cable, a coaxial cable, an optical fiber cable, or an ultra wide-band (UWB) module.

The another communication module 214 may include at least one communication chip that performs communication according to various wireless communication standards such as Zigbee, 3rd Generation (3G), 3rd Generation Partnership Project (3GPP), Long Term Evolution (LTE), LTE Advanced (LTE-A), 4th Generation (4G), 5th Generation (5G), etc. The another communication module 214 may also be applied to various wireless communication standards developed after 5G.

The electronic apparatus 100 may communicate with the server 500 through the wired communication module 114. The external apparatus 200 may communicate with the server 500 through the another communication module 214. The electronic apparatus 100 and the external apparatus 200 may be connected with each other by using the server 500.

Communication speed using the D2D channel may be faster than communication speed using the AP device 400. If it is identified that the predetermined event is generated, the electronic apparatus 100 may change the first connection method using the AP device 400 to the second connection method using the D2D channel.

If the predetermined event is identified while the electronic apparatus 100 is connected with the external apparatus 200 by a specific communication method (communication using the AP device 400), the electronic apparatus 100 may attempt at least one of Wi-Fi direct communication, Bluetooth communication, or communication using the server 500.

The predetermined event may be an event wherein communication strength between the electronic apparatus 100 and the external apparatus 200 is smaller than the threshold strength. The communication strength may mean the signal strength regarding communication between the electronic apparatus 100 and the external apparatus 200 using the AP device 400.

According to the various embodiments, if the predetermined event is identified, the electronic apparatus 100 may attempt Wi-Fi direct communication first of all. If it is identified that Wi-Fi direct communication is impossible, the electronic apparatus 100 may attempt Bluetooth communication. If it is identified that Bluetooth communication is impossible, the electronic apparatus 100 may attempt communication using the server 500. If communication using the server 500 is impossible, the electronic apparatus 100 may be connected with the external apparatus 200 by a conventional communication method (communication using the AP device 400).

Also, according to the various embodiments, if the predetermined event is identified, the electronic apparatus 100 may attempt Wi-Fi direct communication first of all. If it is identified that Wi-Fi direct communication is impossible, the electronic apparatus 100 may attempt communication using the server 500. If it is identified that communication using the server 500 is impossible, the electronic apparatus 100 may attempt Bluetooth communication. If Bluetooth communication is impossible, the electronic apparatus 100 may be connected with the external apparatus 200 by the conventional communication method (communication using the AP device 400).

In addition, according to the various embodiments, if the predetermined event is identified, the electronic apparatus 100 may attempt Bluetooth communication first of all. If it is identified that Bluetooth communication is impossible, the electronic apparatus 100 may attempt Wi-Fi direct communication. If it is identified that Wi-Fi direct communication is impossible, the electronic apparatus 100 may attempt communication using the server 500. If communication using the server 500 is impossible, the electronic apparatus 100 may be connected with the external apparatus 200 by the conventional communication method (communication using the AP device 400).

Further, according to the various embodiments, if the predetermined event is identified, the electronic apparatus 100 may attempt Bluetooth communication first of all. If it is identified that Bluetooth communication is impossible, the electronic apparatus 100 may attempt communication using the server 500. If it is identified that communication using the server 500 is impossible, the electronic apparatus 100 may attempt Wi-Fi direct communication. If Wi-Fi direct communication is impossible, the electronic apparatus 100 may be connected with the external apparatus 200 by the conventional communication method (communication using the AP device 400).

Also, according to the various embodiments, if the predetermined event is identified, the electronic apparatus 100 may attempt communication using the server 500 first of all. If it is identified that communication using the server 500 is impossible, the electronic apparatus 100 may attempt Wi-Fi direct communication. If it is identified that Wi-Fi direct communication is impossible, the electronic apparatus 100 may attempt Bluetooth communication. If Bluetooth communication is impossible, the electronic apparatus 100 may be connected with the external apparatus 200 by the conventional communication method (communication using the AP device 400).

In addition, according to the various embodiments, if the predetermined event is identified, the electronic apparatus 100 may attempt communication using the server 500 first of all. If it is identified that communication using the server 500 is impossible, the electronic apparatus 100 may attempt Bluetooth communication. If it is identified that Bluetooth communication is impossible, the electronic apparatus 100 may attempt Wi-Fi direct communication. If Wi-Fi direct communication is impossible, the electronic apparatus 100 may be connected with the external apparatus 200 by the conventional communication method (communication using the AP device 400).

Figure 15:
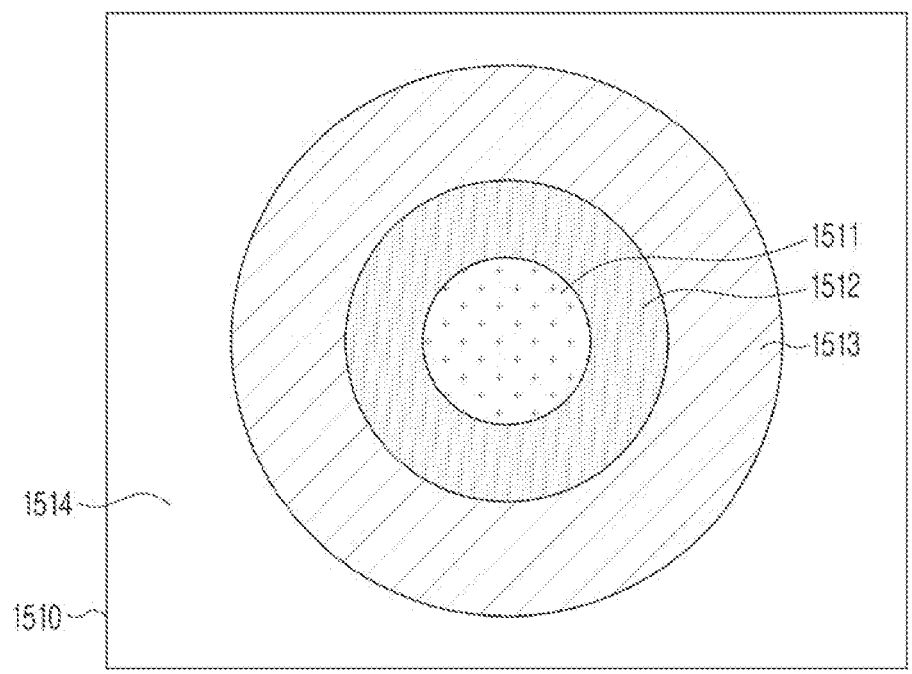
FIG. 15 is a diagram for illustrating areas related to selection of a button (an element) on a control UI.
Figure 15:
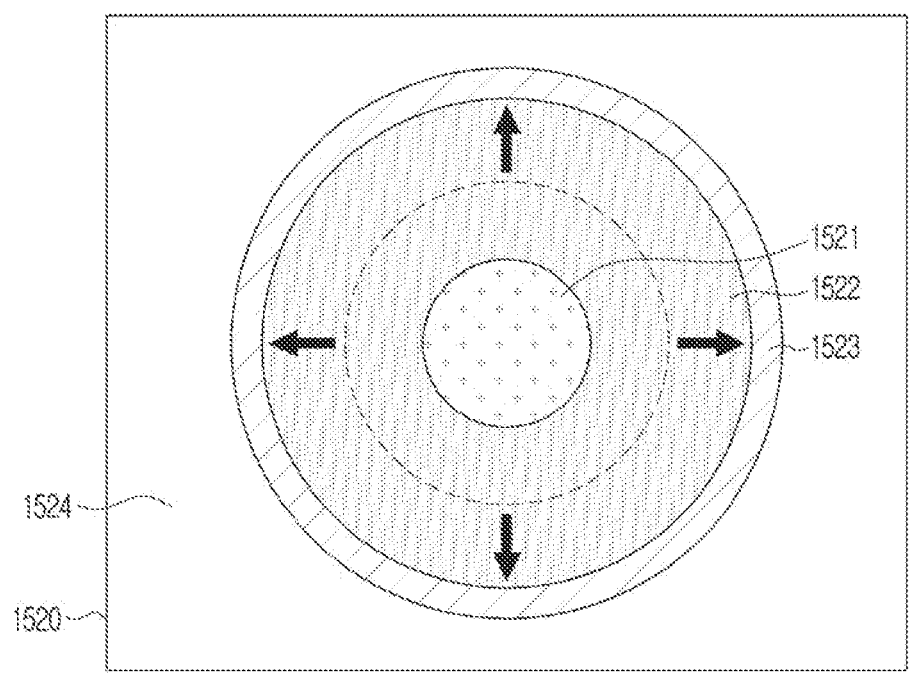

FIG. 15 is a diagram for illustrating areas related to selection of a button (an element) on a control UI.

Referring to FIG. 15, the external apparatus 200 may display the second control UI 20. Through the output second control UI 20, the user may select (or touch) a specific button (element). Whether a specific button is selected may be determined based on an area corresponding to the specific button.

When the second control UI 20 is displayed based on the second UI information, area information corresponding to buttons may be included in the second UI information. The area information may include information related to areas related to button selection.

According to the embodiment 1510 in FIG. 15, the area information may include a button area 1511, a subsidiary button area 1512, and an extensible area 1513. Of the entire area of the display of the external apparatus 200, the area that is not the button area 1511, the subsidiary button area 1512, and the extensible area 1513 may be the remaining area 1514.

The button area 1511 may be an area wherein it is identified that the button is selected.

The subsidiary button area 1512 may be an area wherein the button was not selected by the button area 1511, but it is preliminarily recognized that the button was selected in consideration of the user intent. The subsidiary button area 1512 may be changed.

The extensible area 1513 may mean an area wherein the subsidiary button area 1512 can be extended. If a user input is received in the extensible area 1513, the electronic apparatus 100 identifies that the user touched the surrounding area of the button, but the button was not ultimately selected.

The remaining area 1514 may be an area (out of the entire area of the display) that does not include the button area 1511, the subsidiary button area 1512, and the extensible area 1513. The remaining area 1514 may be described as a blank area, an empty area, etc.

According to the embodiment 1520 in FIG. 15, the button area 1521, the extensible area 1523, and the remaining area 1524 may correspond to the button area 1511, the extensible area 1513, and the remaining area 1514 in the embodiment 1510. The subsidiary button area 1522 in the embodiment 1520 may be extended more than the subsidiary button area 1512 in the embodiment 1510.

According to another implementation example, the subsidiary button area 1512 in the embodiment 1510 may be reduced.

Extension or reduction of the subsidiary button area 1512 may be performed within the extensible areas 1513, 1523. The extensible areas 1513, 1523 may be areas that are used in determining the limitation that the subsidiary button area 1512 can be changed.

If the subsidiary button area 1512 in the embodiment 1510 is extended to the subsidiary button area 1522 in the embodiment 1520, the extensible area 1513 in the embodiment 1510 may be reduced (or shrunk) like the extensible area 1523 in the embodiment 1520.

The electronic apparatus 100 may display a correction guide screen for adjusting the subsidiary button area 1512. The user may determine extension or shrink of the subsidiary button area 1512 through the correction guide screen. For each user, the touch strength (or area) may vary based on the finger length (or thickness). Accordingly, the user may adjust the subsidiary button area 1512 for touch recognition appropriate for the user.

If the user performs a correcting operation, the electronic apparatus 100 may store the correction result of the user, and map the stored correction result with the content and the external apparatus 200, and store them.

For example, if a correction result is acquired, the electronic apparatus 100 may map UI information to which the correction result have been reflected, and store it in a mapping table. The mapping table may be updated whenever a correction result of the user is acquired.

According to the various embodiments, if an event wherein consecutive user inputs for a specific button are received within a threshold time is identified, the electronic apparatus 100 may extend the subsidiary button area corresponding to the specific button.

Also, according to the various embodiments, the electronic apparatus 100 may perform extension or reduction of the subsidiary button area 1512 based on a user voice.

The electronic apparatus 100 may receive a user voice through the microphone included in the electronic apparatus 100 or the microphone included in the external apparatus 200. The electronic apparatus 100 may change the size of the subsidiary button area 1512 according to the received user voice.

As at least one example, if a user voice which is "extend the subsidiary button area" is received, the electronic apparatus 100 may extend the subsidiary button area 1512 as much as a predetermined size.

Also, as at least one example, if a user voice which is "reduce the subsidiary button area" is received, the electronic apparatus 100 may reduce the subsidiary button area 1512 as much as the predetermined size.

The predetermined size may vary according to the user's setting. Also, the predetermined size may mean the unit size which is changed for each step among the changeable sizes of the subsidiary button area 1512. If the user inputs an instruction (or a user voice) for extending or reducing the size of the subsidiary button area 1512, the electronic apparatus 100 may change the subsidiary button area 1512 as much as the unit size.

For example, it is assumed that the maximum changeable diameter is between 10 mm and 20 mm. Also, it is assumed that the current maximum diameter of the subsidiary button area 1512 is 10 mm, and the predetermined size (diameter) is 2 mm. If the user's input which is "extend the subsidiary button area" is received, the electronic apparatus 100 may change the maximum diameter of the subsidiary button area 1512 to 12 mm.

Figure 16:
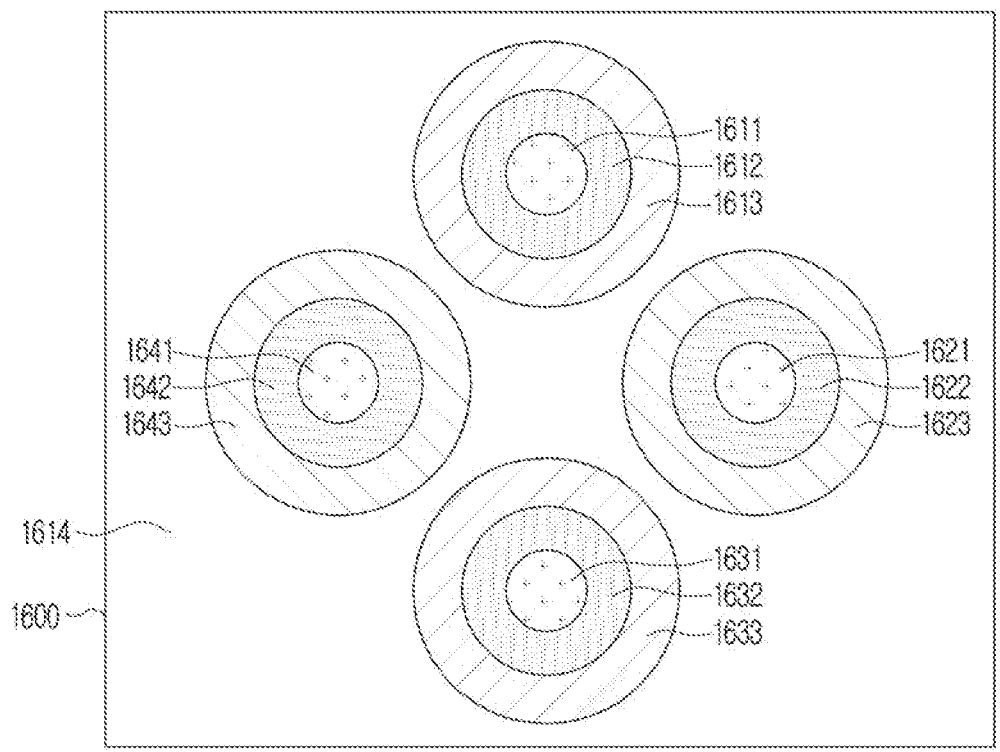
FIG. 16 is a diagram for illustrating areas related to each of a plurality of buttons (elements)

FIG. 16 is a diagram for illustrating areas related to each of a plurality of buttons (elements).

Referring to FIG. 16, if a plurality of buttons exist in the second UI information, area information corresponding to each of the plurality of buttons may be included in the second UI information. For example, the second UI information may include the first area information corresponding to the first button, and the second area information corresponding to the second button.

According to the embodiment 1600 in FIG. 16, it is assumed that the second UI information includes four buttons. The second UI information may include area information corresponding to each of the four buttons.

The second UI information may include a first button area 1611 corresponding to the first button, a first subsidiary button area 1612 corresponding to the first button, and the first extensible area 1613 corresponding to the first button.

Also, the second UI information may include a second button area 1621 corresponding to the second button, a second subsidiary button area 1622 corresponding to the second button, and the second extensible area 1623 corresponding to the second button.

In addition, the second UI information may include a third button area 1631 corresponding to the third button, a third subsidiary button area 1632 corresponding to the third button, and the third extensible area 1633 corresponding to the third button.

Further, the second UI information may include a fourth button area 1641 corresponding to the fourth button, a fourth subsidiary button area 1642 corresponding to the fourth button, and the fourth extensible area 1643 corresponding to the fourth button.

Out of the entire area of the display of the external apparatus 200, the area excluding the plurality of areas 1611, 1612, 1613, 1621, 1622, 1623, 1631, 1632, 1633, 1641, 1642, 1643 included in the second UI information may be the remaining area 1614.

In the embodiment in FIG. 16, the areas corresponding to each button were illustrated such that the buttons do not overlap with each other. Depending on implementation examples, some areas may overlap even though they correspond to different buttons. If an area overlapped in different buttons is selected by the user, the electronic apparatus 100 may provide the guide UI 30 indicating that different buttons are overlapped.

Figure 17:
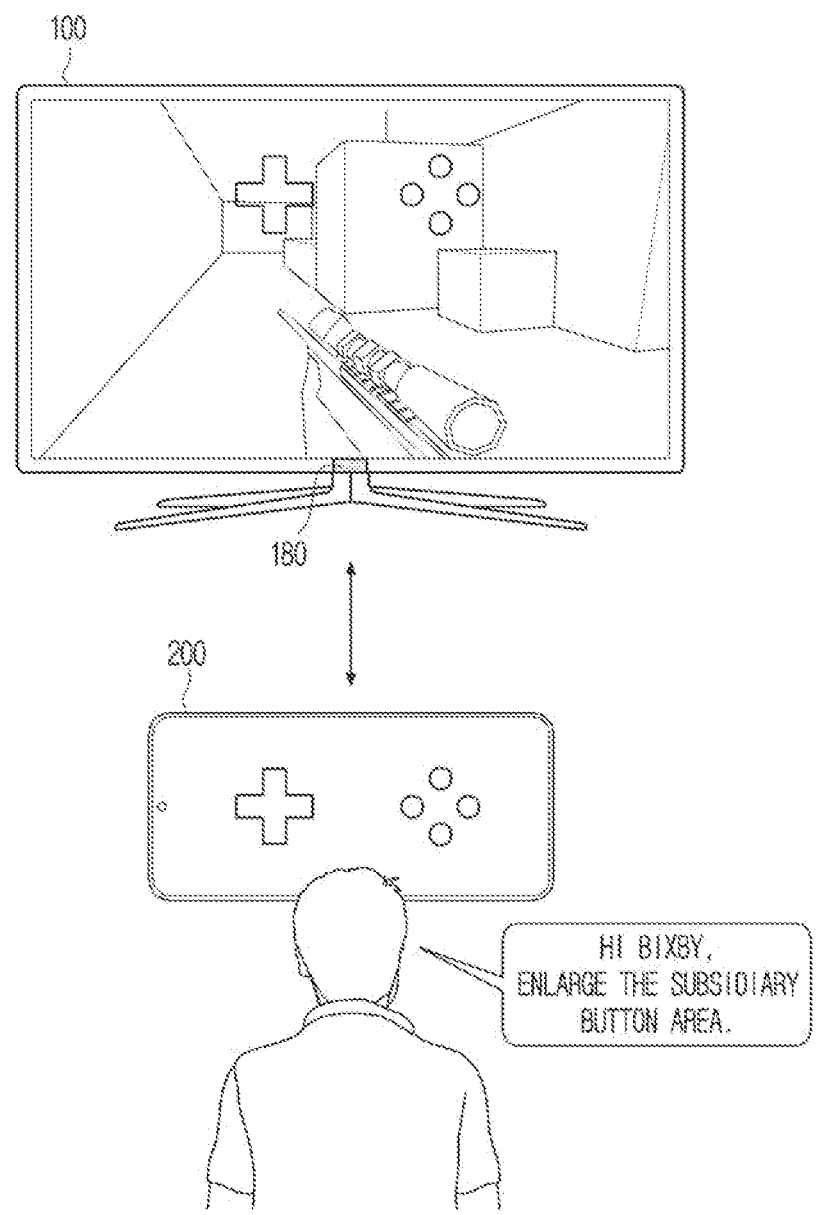
FIG. 17 is a diagram for illustrating an operation of controlling a control UI through voice recognition.

FIG. 17 is a diagram for illustrating an operation of controlling a control UI through voice recognition.

Referring to FIG. 17, the electronic apparatus 100 may include a microphone 180. The electronic apparatus 100 may acquire the user's voice input through the microphone 180. When the voice input is received, the electronic apparatus 100 may perform an operation corresponding to the voice input.

A voice input may be an input for changing the first control UI 10. The electronic apparatus 100 may adjust the shape, the location, the area, the size, the color, and the transparency of the first control UI 10 based on the voice input. An area may indicate the area information described in FIG. 15.

Also, a voice input may be an input for changing the guide UI 30. The electronic apparatus 100 may adjust the shape, the location, the size, the color, and the transparency of the guide UI 30 based on the voice input.

Depending on implementation examples, a voice input may be acquired through the external apparatus 200. The external apparatus 200 may acquire a voice input and transmit it to the electronic apparatus 100. The electronic apparatus 100 may perform an operation corresponding to the voice input based on the voice input.

An analyzing operation for a voice input may be performed by a voice recognition function. The voice recognition function may be performed in the electronic apparatus 100 or the external apparatus 200.

Depending on implementation examples, the voice recognition function may be performed at a separate external server. The electronic apparatus 100 or the external apparatus 200 may receive a voice input and transmit it to the external server. The electronic apparatus 100 or the external apparatus 200 may receive result information (e.g., a text) corresponding to the voice input analyzed at the external server, and perform an operation corresponding to the voice input.

Figure 18:
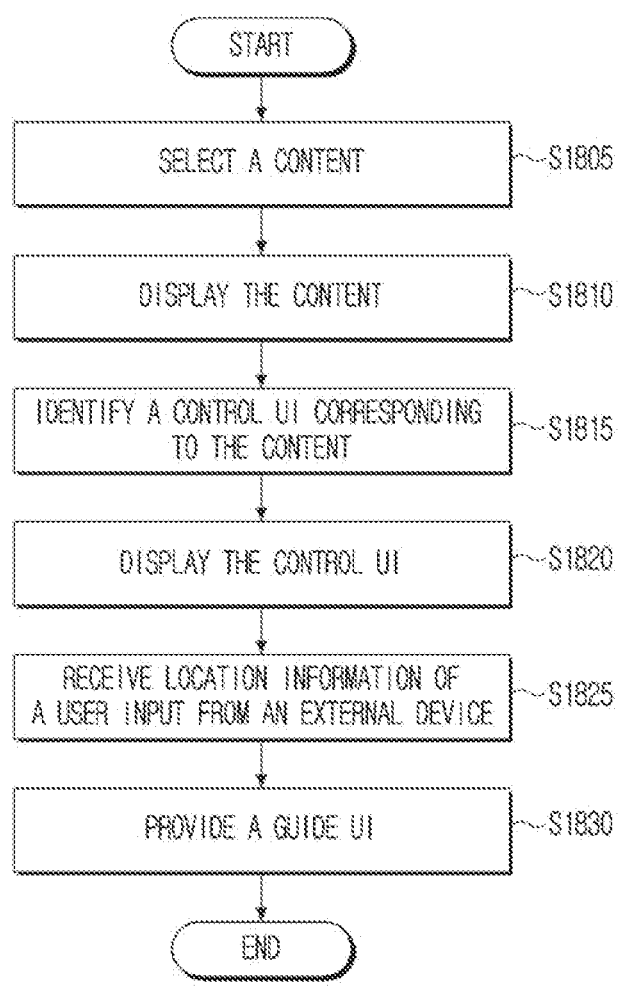
FIG. 18 is a flow chart for illustrating an operation of displaying a control UI and a guide UI.

FIG. 18 is a flow chart for illustrating an operation of displaying a control UI and a guide UI.

Referring to FIG. 18, the electronic apparatus 100 may select (or determine) content in operation S1805.

The electronic apparatus 100 may execute an application stored in the electronic apparatus 100 and provide content. The electronic apparatus 100 may provide content selected by the user among a plurality of content. The electronic apparatus 100 may guide the user's selection by displaying content list.

The content list may include a plurality of content that can be provided in the electronic apparatus 100. The user may select one content among the plurality of content included in the content list.

The content list may preferentially display a main content among the plurality of content that can be provided by the electronic apparatus 100. A method of preferentially displaying a main content may mean a method of displaying a main content having priority in the uppermost area in the content list, or a method of displaying a main content having priority by emphasizing it in the predetermined color.

According to the various embodiments, if the controller 300 is connected to the electronic apparatus 100, the electronic apparatus 100 may determine content that can be manipulated by the controller 300 among the plurality of content included in the content list as the main content.

Also, according to the various embodiments, if the external apparatus 200 is connected to the electronic apparatus 100, the electronic apparatus 100 may determine content that can be manipulated by the controller among the plurality of content included in the content list as the main content. The external apparatus 200 may indicate an apparatus including a display, and it may display a control UI of various controllers. Accordingly, the external apparatus 200 may perform the roles of various controllers. The plurality of content may be divided into content that can be manipulated by controllers and content that do not need controllers. If the external apparatus 200 is connected to the electronic apparatus 100, the electronic apparatus 100 may determine content needing a controller among the plurality of content included in the content list as the main content.

In addition, according to the various embodiments, if the external apparatus 200 is connected to the electronic apparatus 100, the electronic apparatus 100 may determine content that can be manipulated by a pre-registered controller 300 among the plurality of content included in the content list as the main content. The electronic apparatus 100 may store the pre-registered controller 300 that has history of having been connected to the electronic apparatus 100 at least once. The electronic apparatus 100 may determine content that can be manipulated by the pre-registered controller 300 as the main content based on the storage history information.

The electronic apparatus 100 may preferentially display a main content in the content list. The user can easily recognize the main content that was preferentially output.

The electronic apparatus 100 may identify content selected by the user. The electronic apparatus 100 may display the selected content in operation S1810.

The electronic apparatus 100 may identify a control UI corresponding to the content in operation S1815. The electronic apparatus 100 may display the identified control UI in operation S1820.

The electronic apparatus 100 may identify a control UI corresponding to the selected content. When a control UI corresponding to the selected content is identified, the electronic apparatus 100 may transmit the identified control UI to the external apparatus 200. The control UI may be transmitted through the UI information.

If a control UI corresponding to the selected content is not identified, the electronic apparatus 100 may transmit a basic control UI to the external apparatus 200. The basic control UI may mean a UI including essential buttons for general content manipulations. Even if the content cannot be completely controlled through the basic control UI (or a default UI), the user may manipulate essential functions (some functions) through the basic control UI.

The electronic apparatus 100 may receive the location information of the user input from the external apparatus 200 in operation S1825. The electronic apparatus 100 may provide the guide UI 30 based on the location information of the user input. The electronic apparatus 100 may determine a specific location in which the guide UI 30 will be displayed based on the location information of the user input. The electronic apparatus 100 may provide the guide UI 30 in the determined location.

FIG. 19 is a flow chart for illustrating a second control UI displayed on the electronic apparatus 100 and a third control UI displayed on the external apparatus 200.

Referring to FIG. 19, the electronic apparatus 100 may select content in operation S1905. The electronic apparatus 100 may display the content in operation S1910. The electronic apparatus 100 may identify the controller 300 corresponding to the content in operation S1915. The controller 300 may mean a dedicated controller or a virtual controller corresponding to the content.

The electronic apparatus 100 may identify whether the controller 300 is connected in operation S1920. If the controller 300 is connected in operation S1920-Y, the electronic apparatus 100 may communicate with the controller 300 in operation S1925.

If the controller 300 is not connected in operation S1920-N, the electronic apparatus 100 may identify whether the external apparatus 200 is connected in operation S1930. If the external apparatus 200 is not connected in operation S1930-N, the electronic apparatus 100 may repeat the operations S1920 and S1930.

If the external apparatus 200 is connected in operation S1930-Y, the electronic apparatus 100 may acquire the first UI information of the controller 300 in operation S1935. The external apparatus 200 may identify the controller 300 corresponding to the content, and acquire the first UI information indicating information related to the button of the identified controller 300.

A controller mapping table may be used for acquiring the first UI information. The mapping table may include information related to the buttons of each controller.

For example, the mapping table may include the first UI information of the first controller, the first UI information of the second controller, the first UI information of the third controller, and the first UI information of the fourth controller. If the first controller is connected to the electronic apparatus 100, the electronic apparatus 100 may acquire the first UI information of the first controller based on the mapping table.

According to the various embodiments, the mapping table may be stored in the electronic apparatus 100.

Also, according to the various embodiments, the mapping table may be stored in an external server. The external server may be a server providing content or a server providing a service related to the electronic apparatus 100.

The electronic apparatus 100 may request the size information of the external apparatus 200 to the external apparatus 200 in operation S1940. The external apparatus 200 may transmit the size information of the external apparatus 200 to the electronic apparatus 100 in response to the request in operation S1945. The electronic apparatus 100 may receive the size information of the external apparatus 200.

The electronic apparatus 100 may acquire the second UI information based on the first UI information and the size information of the external apparatus 200 in operation S1950. The electronic apparatus 100 may change the first UI information to the second UI information based on the size information of the external apparatus 200. As the actual size of the controller 300 and the size of the display of the external apparatus 200 are different, there is a need that some of the detailed UI information included in the first UI information is changed.

For example, the electronic apparatus 100 may acquire the second UI information by changing the size of the button included in the first UI information based on the size information of the external apparatus 200.

The electronic apparatus 100 may transmit the second UI information to the external apparatus 200 in operation S1955. The external apparatus 200 may receive the second UI information from the electronic apparatus 100. The external apparatus 200 may display the second control UI 20 based on the second UI information in operation S1960.

The electronic apparatus 100 may acquire the third UI information based on the first UI information and the size information of the electronic apparatus 100 in operation S1965. The electronic apparatus 100 may change the first UI information to the third UI information based on the size information of the electronic apparatus 100. As the actual size of the controller 300 and the size of the display 120 of the electronic apparatus 100 are different, there is a need that some of the detailed UI information included in the first UI information is changed.

The electronic apparatus 100 may display the first control UI 10 based on the third UI information in operation S1970.

The size information of the electronic apparatus 100 and the size information of the external apparatus 200 may also be described as the size information of the display 120 included in the electronic apparatus 100 and the size information of the display included in the external apparatus 200.

According to the various embodiments, the operations S1920 and S1925 may be omitted.

Also, according to the various embodiments, the electronic apparatus 100 may display at least one of a screen including content, a screen including the first control UI 10, or a screen including the guide UI 30 in an overlapped manner. The screen may also be described as a layer.

In addition, according to the various embodiments, the screen including the first control UI 10 and the screen including the guide UI 30 may be implemented as one screen.

Further, according to the various embodiments, the electronic apparatus 100 may combine the screen including content, the screen including the first control UI 10, and the screen including the guide UI 30 as one screen. The electronic apparatus 100 may display the combined one screen.

Figure 20:
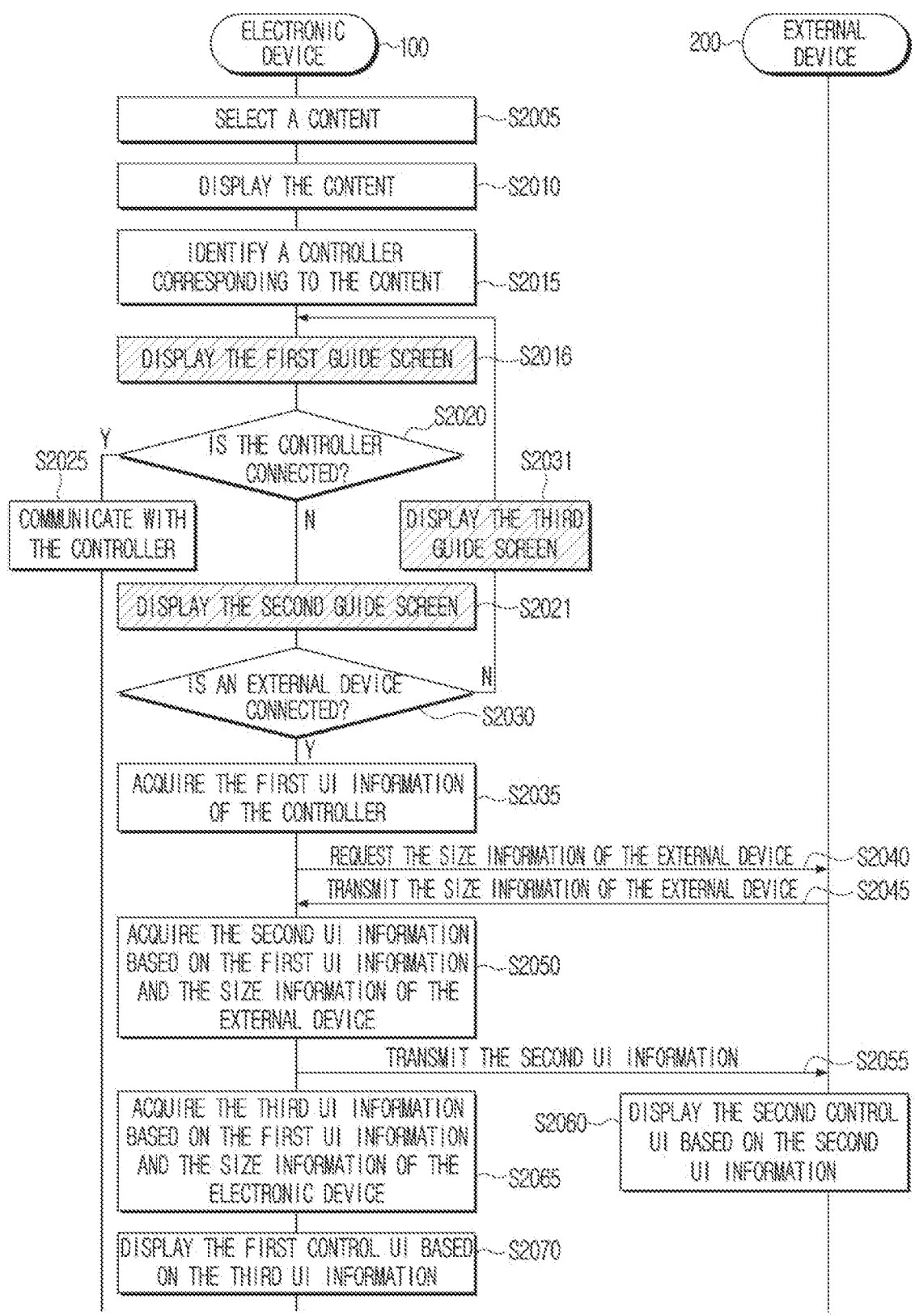
FIG. 20 is a flow chart for illustrating a guide screen displayed in relation to connection of an electronic apparatus, a controller, and an external apparatus.

FIG. 20 is a flow chart for illustrating a guide screen displayed in relation to connection of the electronic apparatus 100, the controller 300, and the external apparatus 200.

Referring to FIG. 20, the operations S2005, S2010, S2015, S2020, S2025, S2030, S2035, S2040, S2045, S2050, S2055, S2060, S2065, and S2070 in FIG. 20 may correspond to the operations S1905, S1910, S1915, S1920, S1925, S1930, S1935, S1940, S1945, S1950, S1955, S1960, S1965, and S1970 in FIG. 19. Accordingly, overlapping explanation will be omitted.

After the controller 300 corresponding to content is identified in operation S2015, the electronic apparatus 100 may display a first guide screen in operation S2016. The first guide screen may include information guiding connection of the controller 300 for manipulating the selected content.

If the controller 300 is not connected in operation S2020-N, the electronic apparatus 100 may display a second guide screen in operation S2021. The second guide screen may include information guiding connection of the external apparatus 200 for manipulating the content with another apparatus that is not the controller 300.

According to the various embodiments, the first guide screen and the second screen may be identical as one screen. Explanation in this regard is described in FIG. 5.

Also, according to the various embodiments, the first guide screen and the second screen may be different.

If the external apparatus 200 is not connected in operation S2030-N, the electronic apparatus 100 may display a third guide screen in operation S2031. The third guide screen may include information notifying to the user that an apparatus for manipulating the content is not connected.

According to the various embodiments, some of the operations of displaying the first guide screen, the second guide screen, and the third guide screen may be omitted.

Figure 21:
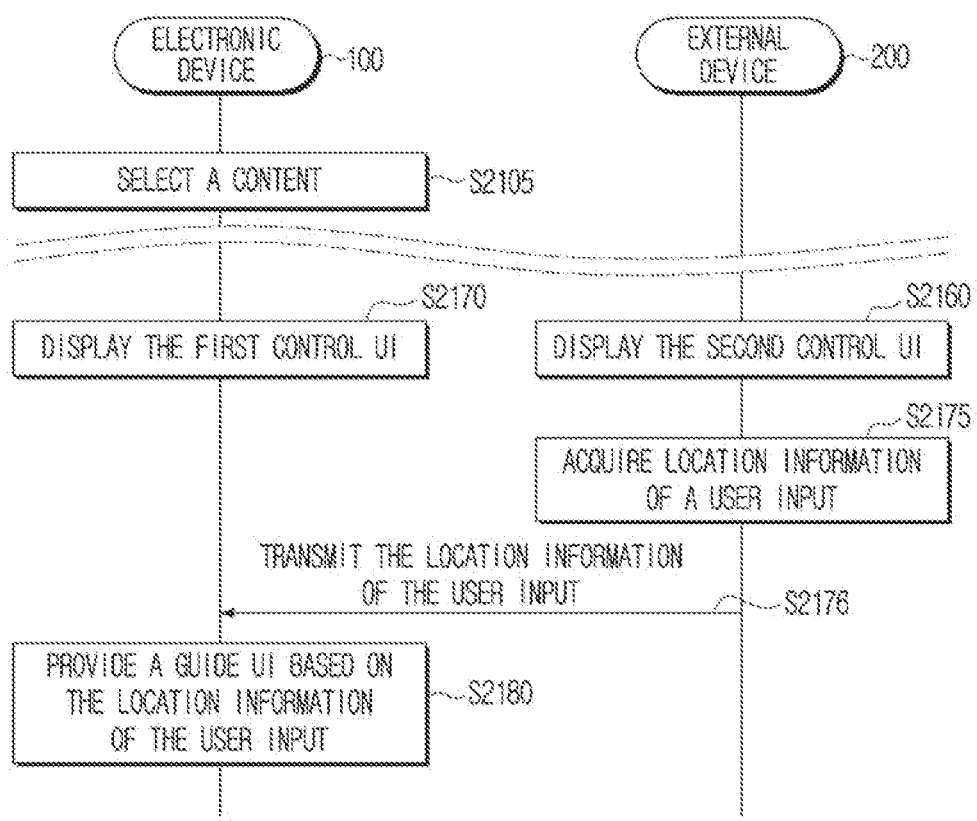
FIG. 21 is a flow chart for illustrating an operation of displaying a guide UI.

FIG. 21 is a flow chart for illustrating an operation of displaying a guide UI.

Referring to FIG. 21, the operations S2105 to S2170 may correspond to the operations S1905 to S1970 in FIG. 19. Accordingly, overlapping explanation will be omitted. FIG. 21 was illustrated while some steps are omitted.

After the first control UI 10 is displayed on the electronic apparatus 100 and the second control UI 20 is output on the external apparatus 200, the external apparatus 200 may acquire location information of a user input in operation S2175. The external apparatus 200 may receive a user input, and identify location information corresponding to the received user input. The external apparatus 200 may transmit the location information of the user input to the electronic apparatus 100 in operation S2176.

The electronic apparatus 100 may provide the guide UI 30 based on the location information of the user input received from the external apparatus 200 in operation S2180.

According to the various embodiments, if a user input is received, the electronic apparatus 100 may provide the guide UI 30 based on the location of the user input. For example, the guide UI 30 may be displayed whenever a user input is received.

Also, according to the various embodiments, the format (the shape, the size, the color, the transparency, etc.) of the guide UI 30 may be partially changed based on the location of a user input.

In addition, according to the various embodiments, the electronic apparatus 100 may provide the guide UI 30 only in the case of misrecognition. A case of misrecognition may mean an event wherein it is identified that a user input was received in the extensible area 1513 in FIG. 15.

Figure 22:
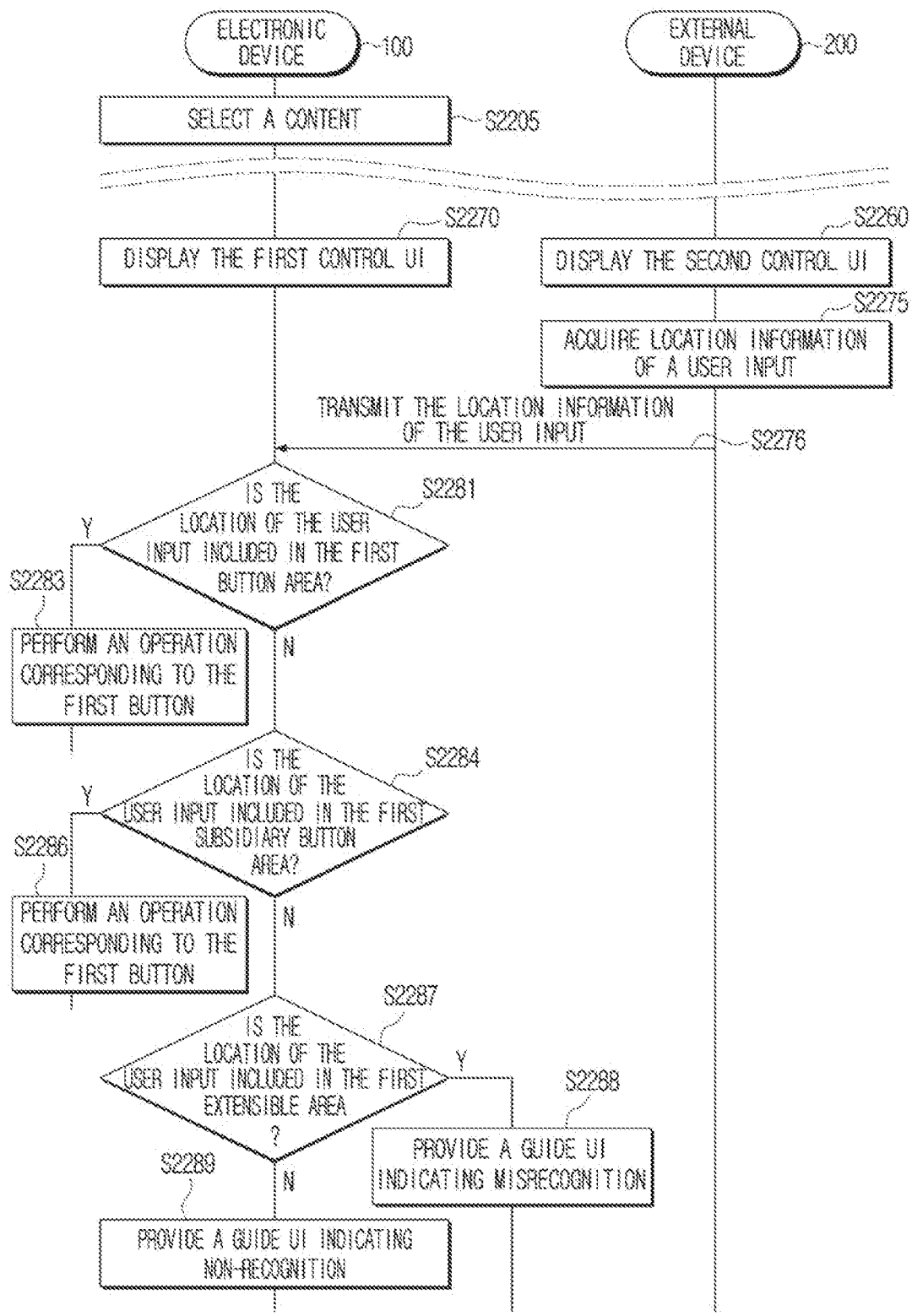
FIG. 22 is a flow chart for illustrating an operation of displaying a guide UI in case a button is not recognized.

FIG. 22 is a flow chart for illustrating an operation of displaying a guide UI in case a button is not recognized.

The operations S2205 to S2276 in FIG. 22 may correspond to the operations S2105 to S2176 in FIG. 21. Accordingly, overlapping explanation will be omitted.

The electronic apparatus 100 may identify whether a location of a user input is included in the first button area in operation S2281. If the location of the user input is included in the first button area in operation S2281-Y, the electronic apparatus 100 may perform an operation corresponding to the first button in operation S2283.

If the location of the user input is not included in the first button area in operation S2281-N, the electronic apparatus 100 may identify whether the location of the user input is included in the first subsidiary button area in operation S2284. If the location of the user input is included in the first subsidiary button area in operation S2284-Y, the electronic apparatus 100 may perform an operation corresponding to the first button in operation S2286.

If the location of the user input is not included in the first subsidiary button area in operation S2284-N, the electronic apparatus 100 may identify whether the location of the user input is included in the first extensible area in operation S2287.

If the location of the user input is included in the first extensible area in operation S2287-Y, the electronic apparatus 100 may display a guide UI indicating misrecognition in operation S2288.

If the location of the user input is not included in the first extensible area in operation S2287-N, the electronic apparatus 100 may display a guide UI indicating non-recognition in operation S2288.

According to the various embodiments, a guide UI indicating misrecognition and a guide UI indicating non-recognition may be different.

Also, according to the various embodiments, a guide UI indicating misrecognition and a guide UI indicating non-recognition may be identical.

Figure 23:
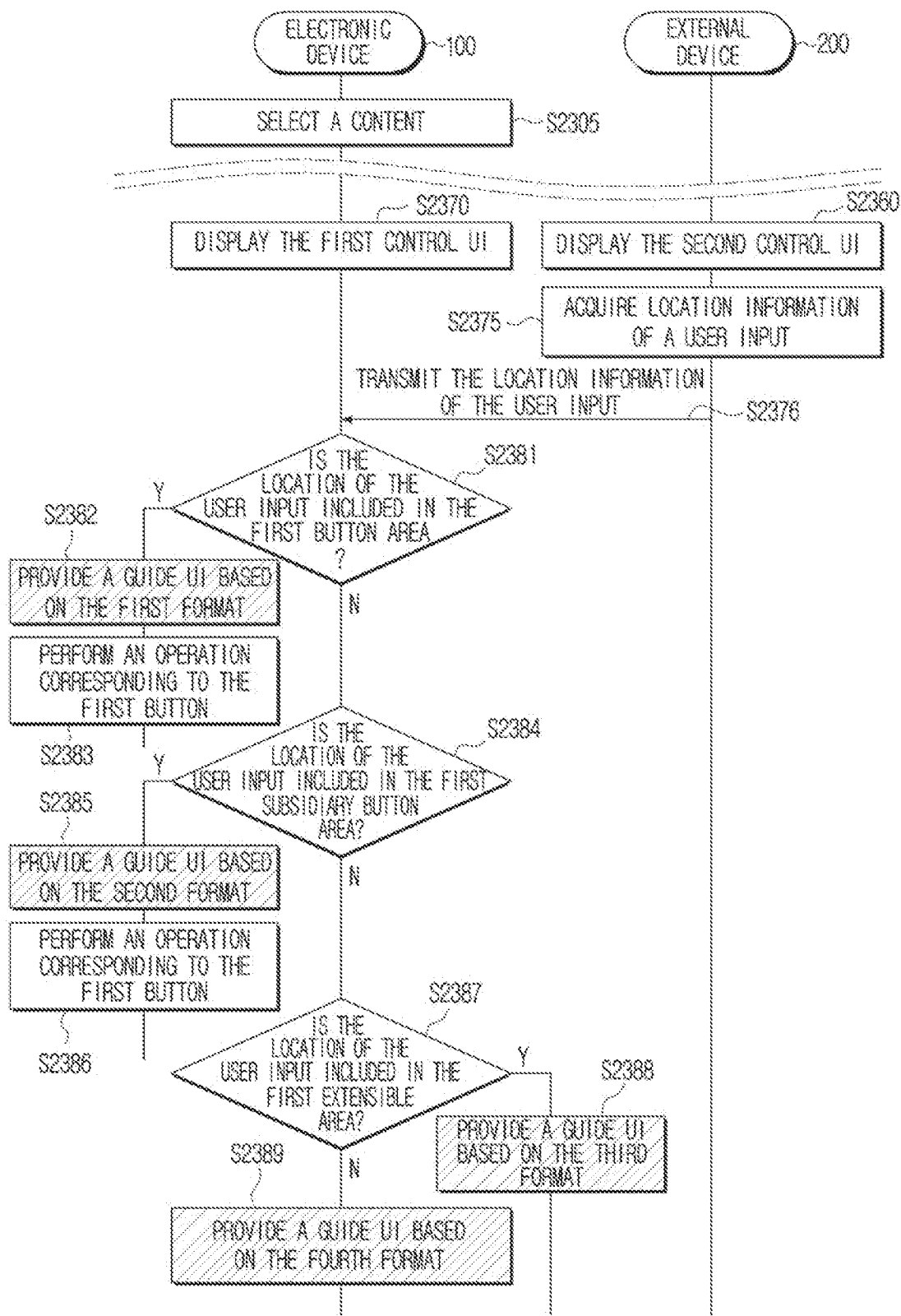
FIG. 23 is a flow chart for illustrating an operation of displaying a guide UI corresponding to a user input.

FIG. 23 is a flow chart for illustrating an operation of displaying a guide UI corresponding to a user input.

The operations S2305 to S2376, S2381, S2383, S2384, S2386, and S2387 in FIG. 23 may correspond to the operations S2205 to S2276, S2281, S2283, S2284, S2286, and S2287 in FIG. 22. Accordingly, overlapping explanation will be omitted.

If a location of a user input is included in the first button area in operation S2381-Y, the electronic apparatus 100 may provide the guide UI 30 based on the first format in operation S2382. The electronic apparatus 100 may perform an operation corresponding to the first button in operation S2383.

If the location of the user input is included in the first subsidiary button area in operation S2384-Y, the electronic apparatus 100 may provide the guide UI 30 based on the second format in operation S2385. The electronic apparatus 100 may perform an operation corresponding to the first button in operation S2386.

If the location of the user input is included in the first extensible area in operation S2387-Y, the electronic apparatus 100 may provide the guide UI 30 based on the third format in operation S2388.

If the location of the user input is not included in the first extensible area in operation S2387-N, the electronic apparatus 100 may provide the guide UI 30 based on the fourth format in operation S2389.

The first format to the fourth format may include at least one of a shape, a location, a size, a color, or transparency.

According to the various embodiments, at least one of the shapes, the locations, the sizes, the colors, or the transparency of the first format to the fourth format may be different.

Also, according to the various embodiments, all of the shapes, the locations, the sizes, the colors, or the transparency of the first format to the fourth format may be identical.

In addition, according to the various embodiments, the first format and the second format may be identical, and the first format and the third format may be different, and the third format and the fourth format may be identical.

Further, according to the various embodiments, all of the first format, the second format, and the third format may be different.

Also, according to the various embodiments, the operation S2389 may be omitted.

A guide UI was explained as an image, an icon, etc., but is not limited to visual information. A guide UI may include at least one of vibration, haptic, or an audio signal.

According to the various embodiments, if an event wherein a location of a user input moves in the order of a button area, a subsidiary button area, and an extensible area is identified, the electronic apparatus 100 may provide a notification to the user. The method of providing a notification may include at least one of vibration, haptic, or an audio signal. The first format to the fourth format may include at least one of the strength of vibration, the strength of haptic, or the size of an audio signal. The electronic apparatus 100 may generate a control signal for providing a notification, and transmit the signal to the external apparatus 200. The external apparatus 200 may provide a notification based on the received control signal.

If a touch location moves in the order of a button area, a subsidiary button area, and an extensible area, the output strength of the guide UI may also become stronger.

According to the various embodiments, the output strength of the guide UI may vary according to the state of communicative connection between the electronic apparatus 100 and the external apparatus 200, the data state, or the response speed.

If the strength of communicative connection is smaller than or equal to the threshold strength or the response speed is smaller than or equal to the threshold speed, the electronic apparatus 100 may not provide a guide UI of vibration, haptic, an audio signal, etc. Also, if the strength of communicative connection is smaller than or equal to the threshold strength or the response speed is smaller than or equal to the threshold speed, the electronic apparatus 100 may provide the guide UI 30 in a form of an image.

If a user input is received in the remaining area, the electronic apparatus 100 may not provide a guide UI.

According to the various embodiments, the electronic apparatus 100 may display the guide UI 30 by displaying image information (or an icon). If a predetermined event is identified while providing the guide UI 30 in a form of an image, the electronic apparatus 100 may provide the guide UI by using at least one of vibration, haptic, or an audio signal which are not in a form of an image.

The predetermined event may be an event wherein image information other than content cannot be displayed on the electronic apparatus 100. An event wherein image information (a guide UI) cannot be displayed may be an event wherein content server providing content determined by itself that image information (a guide UI) of the content cannot be displayed. Also, an event wherein image information (a guide UI) cannot be displayed may mean an event wherein content viewing will be interfered as image information (a guide UI) is displayed.

Figure 24:
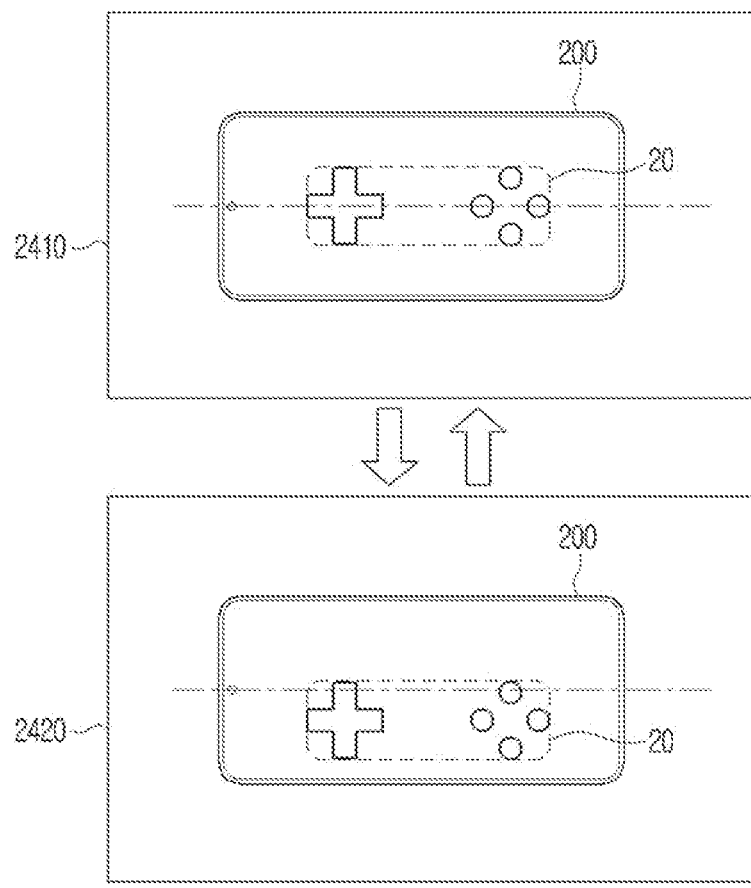
FIG. 24 is a diagram for illustrating an operation of changing the location of a control UI.

FIG. 24 is a diagram for illustrating an operation of changing the location of a control UI.

Referring to FIG. 24, the electronic apparatus 100 may change the output location of the second control UI 20. The electronic apparatus 100 may change the location where the second control UI 20 is displayed by changing the locations of the elements of the second UI information.

The electronic apparatus 100 may change the output location of the second control UI 20 based on a predetermined event.

The embodiment 2410 in FIG. 24 indicates that the second control UI 20 is displayed based on the initially set second UI information.

The embodiment 2420 in FIG. 24 indicates that the second control UI 20 is displayed based on the changed second UI information.

According to the various embodiments, an event wherein the embodiment 2410 is changed to the embodiment 2420 may be an event wherein a user input for changing the output location of the second control UI 20 is received. The electronic apparatus 100 may change the output location of the second control UI 20 based on the user input (or instruction).

Also, according to the various embodiments, an event wherein the embodiment 2410 is changed to the embodiment 2420 may be an event wherein a location of a user input moves in the order of a button area, a subsidiary button area, and an extensible area.

For example, if an event wherein a first user input is identified in a button area, a second user input is identified in a subsidiary button area, and a third user input is identified in an extensible area is identified, the electronic apparatus 100 may change the output location of the second control UI 20 based on the location of the third user input.

The first user input, the second user input, and the third user input may be consecutive inputs. The second user input may be an input that was consecutively acquired after the first user input was acquired. The third user input may be an input that was consecutively acquired after the second user input was acquired.

According to the various embodiments, an event wherein the embodiment 2420 is changed to the embodiment 2410 may be an event wherein the user's gaze is toward the external apparatus 200. In case the user's gaze is toward the external apparatus 200, the electronic apparatus 100 may determine that the user feels that the changed location of the second control UI 20 is inconvenient. If an event wherein the user's gaze is toward the external apparatus 200 is identified, the electronic apparatus 100 may change the location of the second control UI 20 to the initially set location.

For identifying an event wherein the user's gaze is toward the external apparatus 200, the electronic apparatus 100 may use the camera 190 or a gyro sensor. One or more embodiments of using the camera will be described with reference to FIG. 25.

The gyro sensor may be included in the external apparatus 200. The external apparatus 200 may acquire the tilt information of the external apparatus 200 through the gyro sensor. The external apparatus 200 may transmit the tilt information to the electronic apparatus 100. The electronic apparatus 100 may receive the tilt information of the external apparatus 200. The electronic apparatus 100 may identify whether the user's gaze is toward the external apparatus 200 based on the tilt information of the external apparatus 200. Although the user's gaze cannot be directly identified with the tilt information, the electronic apparatus 100 may determine that the user feels that the changed location of the second control UI 20 is inconvenient through the external apparatus 200 tilted by a specific tilt.

According to the various embodiments, if an event wherein a user input is located in an extensible area, and then the external apparatus 200 is tilted by a specific tilt within a threshold time from the time point when the user input was received (a misrecognition event) is identified, the electronic apparatus 100 may identify that the user feels that the changed location of the second control UI 20 is inconvenient.

If the user's inconvenience is identified, the electronic apparatus 100 may change the location of the second control UI 20 to the initially set location.

According to the various embodiments, an event wherein the embodiment 2420 is changed to the embodiment 2410 may be an event wherein a user input is not received during a predetermined time. The changed location of the second control UI 20 may be a rather inconvenient location to the user compared to the initially set location. If an event wherein a user input is not received during the predetermined time is identified, the electronic apparatus 100 may change the location of the second control UI 20 to the initially set location.

Also, according to the various embodiments, the electronic apparatus 100 may change the locations for each of the plurality of buttons (elements) included in the second control UI 20. For changing the locations for each button, the electronic apparatus 100 may display a correction guide screen.

Figure 25:
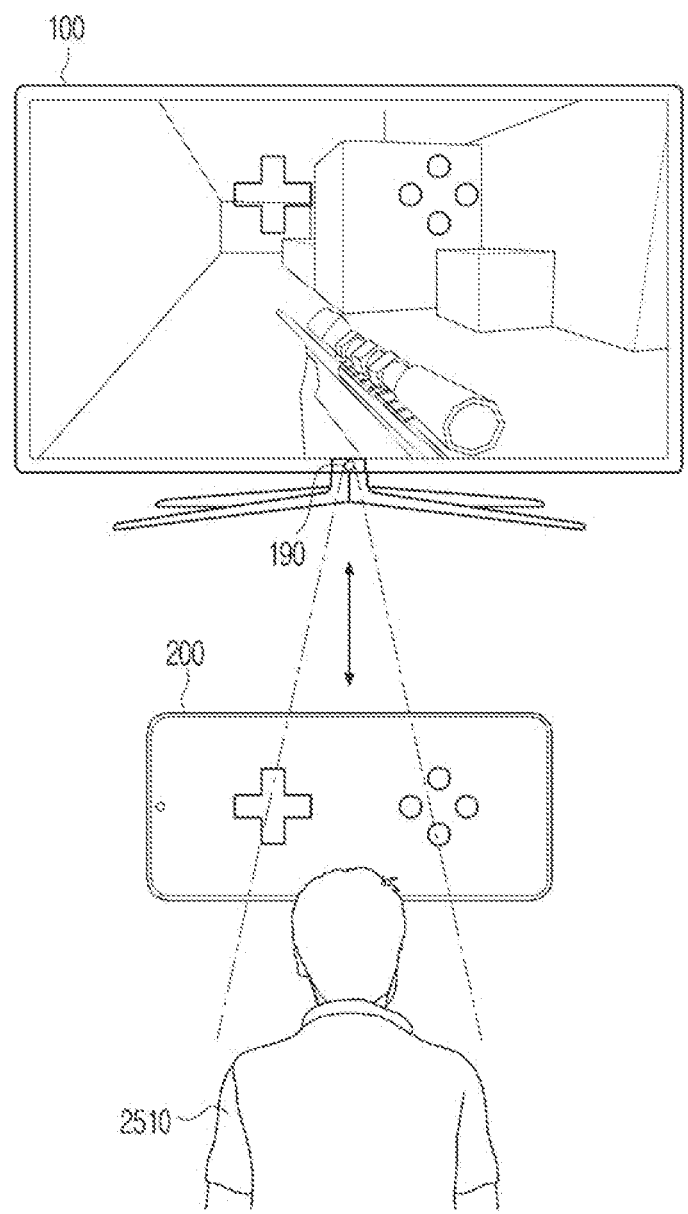
FIG. 25 is a diagram for illustrating an operation of analyzing a photographed image including a user.

FIG. 25 is a diagram for illustrating an operation of analyzing a photographed image including a user.

Referring to FIG. 25, the electronic apparatus 100 may include a camera 190. The electronic apparatus 100 may photograph a user 2510 manipulating the external apparatus 200. The electronic apparatus 100 may acquire a photographed image including the user 2510. The electronic apparatus 100 may analyze the photographed image, and identify whether the gaze of the user 2510 is toward the external apparatus 200.

The electronic apparatus 100 may identify the gaze of the user 2510 based on the photographed image. The electronic apparatus 100 may identify the location of the external apparatus 200 and the location of the iris of the user 2510 based on the photographed image. The electronic apparatus 100 may identify whether the user's gaze is toward the external apparatus 200 based on the location of the external apparatus 200 and the location of the iris of the user 2510.

If an event wherein the user's gaze is toward the external apparatus 200 is identified, the electronic apparatus 100 may change the changed location of the second control UI 20 to the initially set location.

Figure 26:
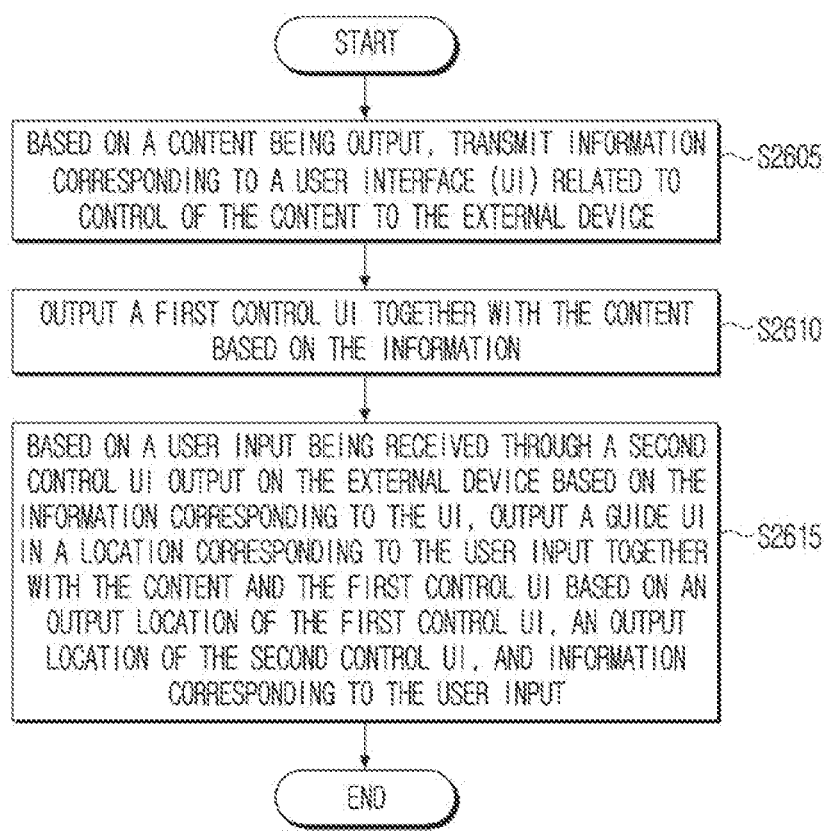
FIG. 26 is a flow chart for illustrating a controlling method of an electronic apparatus according to various embodiments.

FIG. 26 is a flow chart for illustrating a controlling method of the electronic apparatus 100 according to various embodiments.

Referring to FIG. 26, a controlling method of an electronic apparatus communicating with an external apparatus includes the steps of, based on content being output, transmitting information corresponding to a user interface (UI) related to control of the content to the external apparatus (S2605), outputting a first control UI together with the content based on the information corresponding to the UI (S2610), and based on a user input being received through a second control UI output on the external apparatus based on the information corresponding to the UI, outputting a guide UI in a location corresponding to the user input together with the content and the first control UI based on an output location of the first control UI, an output location of the second control UI, and information corresponding to the user input (S2615).

The information corresponding to the UI may be first UI information, and in the operation S2605 of transmitting the information corresponding to the UI to the external apparatus, second UI information may be acquired based on the first UI information and size information of the external apparatus, and the second UI information may be transmitted to the external apparatus.

In the operation S2610 of outputting the first control UI, third UI information may be acquired based on the first UI information and size information of the electronic apparatus, and the first control UI may be output together with the content based on the third UI information.

In the operation S2615 of outputting the guide UI, based on the user input being received through the second control UI output on the external apparatus based on the second UI information, the output location of the first control UI may be acquired based on the third UI information, the output location of the second control UI may be acquired based on the second UI information, and the location corresponding to the user input may be acquired based on the information corresponding to the user input.

The controlling method may further include the step of outputting at least one of the first control UI or the guide UI together with the content based on predetermined transparency.

Also, the controlling method may further include the step of, based on a user input for changing the location of the first control UI being received, outputting the first control UI in the location corresponding to the user input.

In the operation S2610 of outputting the first control UI, the location of the external apparatus may be acquired, and the first control UI may be output in a location corresponding to the location of the external apparatus.

Also, in the operation S2610 of outputting the first control UI, the first control UI including at least one button among a plurality of buttons included in the information corresponding to the UI may be output.

In the operation S2615 of outputting the guide UI, based on the user input being received through the second control UI output on the external apparatus, the guide UI may be output by changing the color based on whether the location corresponding to the user input is included in a predetermined area.

The controlling method may further include the step of, based on information corresponding to a plurality of user inputs being received within a predetermined time through the second control UI output on the external apparatus, transmitting a signal for controlling the output location of the second control UI based on an input pattern acquired based on the information corresponding to the plurality of user inputs to the external apparatus.

The controlling method of an electronic apparatus as in FIG. 26 can be executed on an electronic apparatus having the configuration in FIG. 3 or FIG. 4, and can also be executed on electronic apparatuses having other configurations.

Also, methods according to the aforementioned various embodiments of the disclosure may be implemented in forms of applications that can be installed on conventional electronic apparatuses.

In addition, the methods according to the aforementioned various embodiments of the disclosure may be implemented just with software upgrade, or hardware upgrade of conventional electronic apparatuses.

Further, the aforementioned various embodiments of the disclosure may be performed through an embedded server provided on an electronic apparatus, or an external server of at least one of an electronic apparatus or a display apparatus.

According to one or more embodiments of the disclosure, the aforementioned various embodiments may be implemented as software including instructions stored in machine-readable storage media, which can be read by machines (e.g.: computers). Here, the machines refer to apparatuses that call instructions stored in a storage medium, and can operate according to the called instructions, and the apparatuses may include the electronic apparatus according to the embodiments disclosed herein. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to one or more embodiments of the disclosure, the methods according to the aforementioned various embodiments may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components according to the aforementioned various embodiments (e.g.: a module or a program) may consist of a singular object or a plurality of objects. Also, among the aforementioned corresponding sub components, some sub components may be omitted, or other sub components may be additionally included in the various embodiments. Alternatively or additionally, some components (e.g.: a module or a program) may be integrated as an object, and perform the functions that were performed by each of the components before integration identically or in a similar manner. In addition, operations performed by a module, a program, or other components according to the various embodiments may be executed sequentially, in parallel, repetitively, or heuristically. Or, at least some of the operations may be executed in a different order or omitted, or other operations may be added.

While certain embodiments of the disclosure has been particularly shown and described, it will be understood that various changes in form and details may be made therein without departing from the spirit and scope of the following claims.

What is claimed is:

1. An electronic apparatus comprising:
   a communication interface configured to communicate with an external apparatus;
   a display;
   at least one memory storing instructions; and
   at least one processor operatively connected to the communication interface, the display, and the at least one memory, wherein the at least one processor is configured to execute the instructions to:
      based on content being displayed on the display, transmit first user interface (UI) information corresponding to a UI related to control of the content to the external apparatus through the communication interface,
      control the display to display a first control UI together with the content based on the first UI information,
      obtain second UI information based on the first UI information and size information of a display of the external apparatus, the second UI information comprising a display location of an element of a second control UI displayed on the display of the electronic apparatus,
      transmit the second UI information to the external apparatus through the communication interface, and
      based on a user input being received through the second control UI, control the display to display a guide UI in an input location corresponding to the user input together with the content and the first control UI, based on a first UI display location of the first control UI, a second UI display location of the second control UI, and input information corresponding to the user input.

2. The electronic apparatus of claim 1, wherein the at least one processor is further configured to execute the instructions to:
   obtain third UI information based on the first UI information and size information of the display of the electronic apparatus, and
   control the display of the electronic apparatus to display the first control UI together with the content based on the third UI information.

3. The electronic apparatus of claim 2, wherein the at least one processor is further configured to execute the instructions to:
   based on the user input being received through the second control UI displayed on the display of the external apparatus based on the second UI information, obtain the first UI display location based on the third UI information, obtain the second UI display location based on the second UI information, and obtain the input location based on the input information.

4. The electronic apparatus of claim 1, wherein the at least one processor is further configured to execute the instructions to:
   control the display of the electronic apparatus to display at least one of the first control UI or the guide UI together with the content based on predetermined transparency.

5. The electronic apparatus of claim 1, wherein the at least one processor is further configured to execute the instructions to:
   based on a user input for changing the first UI display location being received, control the display of the electronic apparatus to display the first control UI in the first UI display location corresponding to the user input.

6. The electronic apparatus of claim 1, wherein the at least one processor is further configured to execute the instructions to:
   obtain an apparatus location of the external apparatus, and
   control the display of the electronic apparatus to display the first control UI in the first UI display location to correspond to the apparatus location.

7. The electronic apparatus of claim 1, wherein the at least one processor is further configured to execute the instructions to:
   control the display of the electronic apparatus to display the first control UI comprising at least one button among a plurality of buttons comprised in the first UI information.

8. The electronic apparatus of claim 1, wherein the at least one processor is further configured to execute the instructions to:
   based on the user input being received through the second control UI displayed on the external apparatus, control the display of the electronic apparatus to display the guide UI by changing color based on whether the input location is in a predetermined area.

9. The electronic apparatus of claim 1, wherein the at least one processor is further configured to execute the instructions to:

based on input information corresponding to a plurality of user inputs being received within a predetermined time through the second control UI displayed on the external apparatus, transmit a signal for controlling the second UI display location according to an input pattern obtained based on the input information corresponding to the plurality of user inputs to the external apparatus through the communication interface.

10. A method of controlling an electronic apparatus communicating with an external apparatus, the method comprising:

based on content being displayed, transmitting first user interface (UI) information corresponding to a UI related to control of the content to the external apparatus;

displaying a first control UI together with the content based on the first UI information;

obtaining second UI information based on the first UI information and size information of a display of the external apparatus, the second UI information comprising a display location of an element of a second control UI displayed on the electronic apparatus;

transmitting the second UI information to the external apparatus; and based on a user input being received through the second control UI, displaying a guide UI in an input location corresponding to the user input together with the content and the first control UI, based on a first UI display location of the first control UI, a second UI display location of the second control UI, and input information corresponding to the user input.

11. The method of claim 10, wherein the displaying the first control UI comprises:

obtaining third UI information based on the first UI information and size information of the display of the electronic apparatus; and displaying the first control UI together with the content based on the third UI information.

12. The method of claim 11, wherein the displaying the guide UI comprises:

based on the user input being received through the second control UI displayed on the display of the external apparatus based on the second UI information, obtaining the first UI display location of the first control UI based on the third UI information, obtaining the second UI display location based on the second UI information, and obtaining the input location based on the input information.

13. The method of claim 10, further comprising:

displaying at least one of the first control UI or the guide UI together with the content based on predetermined transparency.

14. The method of claim 10, further comprising:

based on a user input for changing the first UI display location being received, displaying the first control UI in the first UI display location corresponding to the user input.

15. The method of claim 10, further comprising:

obtaining an apparatus location of the external apparatus; and displaying the first control UI in the first UI display location to correspond to the apparatus location.

16. The method of claim 10, further comprising:

displaying the first control UI comprising at least one button among a plurality of buttons comprised in the first UI information.

17. The method of claim 10, further comprising:

based on the user input being received through the second control UI displayed on the external apparatus, displaying the guide UI by changing color based on whether the input location is in a predetermined area.

18. The method of claim 10, further comprising:

based on input information corresponding to a plurality of user inputs being received within a predetermined time through the second control UI displayed on the external apparatus, transmitting a signal for controlling the second UI display location according to an input pattern obtained based on the input information corresponding to the plurality of user inputs to the external apparatus through a communication interface.

* * * * *